US012508207B2

(12) United States Patent
Christie et al.

(10) Patent No.: US 12,508,207 B2
(45) Date of Patent: Dec. 30, 2025

(54) CONTAINER CLOSURE SYSTEM AND SEALING ASSEMBLIES FOR MAINTAINING SEAL INTEGRITY AT LOW STORAGE TEMPERATURES

(71) Applicant: CORNING INCORPORATED, Corning, NY (US)

(72) Inventors: Dane Alphanso Christie, Painted Post, NY (US); Adam Robert Sarafian, Corning, NY (US); Jiangtao Wu, Painted Post, NY (US)

(73) Assignee: CORNING INCORPORATED, Corning, NY (US)

(*) Notice: Subject to any disclaimer, the term of this patent is extended or adjusted under 35 U.S.C. 154(b) by 900 days.

(21) Appl. No.: 17/728,337

(22) Filed: Apr. 25, 2022

(65) Prior Publication Data

US 2022/0339067 A1 Oct. 27, 2022

Related U.S. Application Data

(60) Provisional application No. 63/179,719, filed on Apr. 26, 2021.

(51) Int. Cl.
*A61J 1/14* (2023.01)

(52) U.S. Cl.
CPC .................................. *A61J 1/1412* (2013.01)

(58) Field of Classification Search
None
See application file for complete search history.

(56) References Cited

U.S. PATENT DOCUMENTS 3,653,528 A 4/1972 Wimmer
3,659,736 A 5/1972 Riggs
(Continued)

FOREIGN PATENT DOCUMENTS

CA 3138450 A1 11/2020
CN 101287553 A 10/2008
(Continued)

OTHER PUBLICATIONS

Brigitte Zuleger et al., Container/Closure Integrity Testing and the Identification of a Suitable Vial/Stopper Combination for Low-Temperature Storage at -80° C., 2012, PDA JPST, vol. 66, Abstract (Year: 2012).
(Continued)

*Primary Examiner* — Eli D. Strah
*Assistant Examiner* — Thomas J Kessler
(74) *Attorney, Agent, or Firm* — Michael G. Panian

(57) ABSTRACT

A sealed pharmaceutical container comprises a shoulder, a neck extending from the shoulder, and a flange extending from the neck. The flange comprises an outer surface extending from the underside surface and a contact surface extending between the outer surface and an inner surface defining an opening in the sealed pharmaceutical container. The contact surface comprises an outer peripheral edge disposed proximate to the outer surface of the flange. The sealed pharmaceutical container comprises a sealing assembly comprising a stopper extending over the contact surface of the flange and covering the opening, and a cap securing the stopper to the flange. The stopper comprises a sealing surface that is secured in contact with the contact surface of the flange to form a seal between the flange and the stopper. An outer peripheral edge of the sealing surface is disposed at or radially inward of the outer peripheral edge.

33 Claims, 11 Drawing Sheets

(56) References Cited

U.S. PATENT DOCUMENTS

| | | | | |
|---|---|---|---|---|
| 4,089,432 | A | 5/1978 | Crankshaw et al. | |
| 4,205,754 | A | 6/1980 | Jarsskov et al. | |
| 4,244,478 | A | 1/1981 | Handman | |
| 4,664,277 | A | 5/1987 | Connor | |
| 5,064,083 | A | 11/1991 | Alexander et al. | |
| 5,772,057 | A | 6/1998 | Finneran | |
| 5,803,284 | A | 9/1998 | Grimard | |
| 5,817,082 | A | 10/1998 | Niedospial, Jr. et al. | |
| 5,902,298 | A | 5/1999 | Niedospial et al. | |
| 6,090,093 | A | 7/2000 | Thibault et al. | |
| 6,602,206 | B1 | 8/2003 | Niermann et al. | |
| 6,645,635 | B2 | 11/2003 | Muraki | |
| 7,282,269 | B2 | 10/2007 | Wang et al. | |
| 8,092,878 | B2 | 1/2012 | Miller et al. | |
| 8,497,004 | B2 | 7/2013 | Davis et al. | |
| 8,544,665 | B2 | 10/2013 | Bogle et al. | |
| 8,551,898 | B2 | 10/2013 | Danielson et al. | |
| 8,684,206 | B2 | 4/2014 | Kawachi | |
| 9,080,044 | B2 | 7/2015 | Muto | |
| 9,145,329 | B2 | 9/2015 | Drake et al. | |
| 9,744,099 | B2 | 8/2017 | Fadeev et al. | |
| 10,450,214 | B2 | 10/2019 | Mcenroe et al. | |
| 10,780,021 | B2 | 9/2020 | Weikart et al. | |
| 11,168,019 | B2 | 11/2021 | Schaut et al. | |
| 2002/0023409 | A1 | 2/2002 | Py | |
| 2002/0166326 | A1 | 11/2002 | Giesy et al. | |
| 2003/0029828 | A1 * | 2/2003 | Amschlinger | A61J 1/18 215/247 |
| 2003/0177629 | A1 | 9/2003 | Thibault et al. | |
| 2004/0217081 | A1 | 11/2004 | Konrad | |
| 2007/0102393 | A1 | 5/2007 | Colin et al. | |
| 2007/0246468 | A1 | 10/2007 | Miller et al. | |
| 2009/0145427 | A1 | 6/2009 | Groeger et al. | |
| 2010/0236659 | A1 | 9/2010 | Py et al. | |
| 2010/0273049 | A1 | 10/2010 | Vidal et al. | |
| 2015/0211950 | A1 | 7/2015 | Eckhoff et al. | |
| 2015/0344557 | A1 | 12/2015 | Malik et al. | |
| 2016/0009460 | A1 | 1/2016 | Fournier et al. | |
| 2016/0075485 | A1 | 3/2016 | Masuyama et al. | |
| 2016/0324723 | A1 | 11/2016 | Lippert et al. | |
| 2018/0257975 | A1 | 9/2018 | Kimura et al. | |
| 2020/0146280 | A1 | 5/2020 | Silverman et al. | |
| 2020/0156991 | A1 | 5/2020 | Allington et al. | |
| 2020/0271541 | A1 * | 8/2020 | Mathaes | G01M 3/229 |
| 2021/0002016 | A1 | 1/2021 | Langsdorf et al. | |
| 2021/0212893 | A1 | 7/2021 | Christie et al. | |
| 2022/0168185 | A1 | 6/2022 | Redkar et al. | |
| 2022/0226191 | A1 * | 7/2022 | Folta | B65D 51/002 |

FOREIGN PATENT DOCUMENTS

| | | | | |
|---|---|---|---|---|
| EP | 0267433 | A2 | 5/1988 | |
| EP | 3708137 | A1 | 9/2020 | |
| FR | 0484903 | A | 11/1917 | |
| FR | 2558444 | A1 | 7/1985 | |
| JP | 10-179688 | A | 7/1998 | |
| JP | 2010-209157 | A | 9/2010 | |
| WO | 2013/034594 | A1 | 3/2013 | |
| WO | 2019/213746 | A1 | 11/2019 | |
| WO | 2020/112634 | A1 | 6/2020 | |
| WO | 2020/231474 | A2 | 11/2020 | |
| WO | WO-2021042090 | A2 * | 3/2021 | A61J 1/05 |
| WO | 2021/162984 | A1 | 8/2021 | |
| WO | 2022/020120 | A1 | 1/2022 | |
| WO | 2023/034088 | A1 | 3/2023 | |

OTHER PUBLICATIONS

Duncan et al., Correlating Vial Seal Tightness to Container Closure Integrity at Various Storage Temperatures, Aug. 25, 2015, available at https://www.pharmaceuticalonline.com/doc/correlating-vial-seal-tightness-to-container-closure-integrity-at-various-storage-temperatures-0001. pp. 1-31.

Ethylene-Propylene Rubbers & Elastomers, Apr. 20, 2012, International Institute of Synthetic Rubber Producers, Inc. (Year: 2012).

Hagart-Alexander, C., Temperature Measurement, 2010, Elsevier Inc., pp. 269-271 (Year: 2010).

Iacocca, R., "Primary container design for drug substance and drug substance at Cryo- and cold temperatures," Presented at the 2019 PDA Europe Parenteral Packaging, Venice, Italy, Mar. 19, 2019. pp. 1-22.

Mathaes, R., et al. (2016). "The pharmaceutical vial capping process: Container closure systems, capping equipment, regulatory framework, and seal quality tests", Elsevier, Eur J Pharm Biopharm 99 (2016) 54-64. DOI: http://dx.doi.org/10.1016/j.ejpb.2015.11.016.

Nieto, A. and H. Roehl (2018). "Sealing Behaviour of Container Closure Systems under Frozen Storage Conditions: Nonlinear Finite Element Simulation of Serum Rubber Stoppers." PDA J Pharm Sci and Tech (2018), 72(4): 367-381. DOI: 10.5731/pdajpst.2017.008391.

Sircoulomb et al., "Cryogenic Storage Challenges for Container-Closure Systems," Mar. 25, 2020, available at https://www.pda.org/pda-letter-portal/home/full-article/cryogenic-storage-challenges-for-container-closure-systems. pp. 1-7.

"Molding Innovation into healthcare packaging", Retrieved from: https://www.araymond-life.com/en, ARaymond Life + Schott plastic cap for cold storage CCI presentation at PDA Conference (Mar. 2020), 4 pages.

International Search Report and Written Opinion of the International Searching Authority; PCT/US2022/025278; mailed on Jul. 25, 2022, 13 pages; European Patent Office.

International Search Report and Written Opinion of the International Searching Authority; PCT/US22/41311; mailed on Nov. 22, 2022, 14 pages; European Patent Office.

International Search Report and Written Opinion of the International Searching Authority; PCT/US22/37043; mailed on Nov. 3, 2022, 15 pages; European Patent Office.

"Aluminum, AI", MatWeb, Retrieved from; https://www.matweb.com/search/DataSheet.aspx?MatGUID=0cd1edf33ac145ee93a0aa6fc666c0e0, 2017, 3 pages.

"Overview of Materials for Silicone Rubber", MatWeb, Retrieved from: https://www.matweb.com/search/DataSheet.aspx?MatGUID=cbe7a469897a47eda563816c86a73520 , Dec. 2017, 4 pages.

Melito, "Seal Selection and Thermal Exapansion", Elasto Proxy, Retrieved from: https://www.elastoproxy.com/seal-selection-and-thermal-expansion, 2013, 3 pages.

Zhao et al., "Study on Optimization of Damping Performance and Damping Temperature Range of Silicone Rubber by Polyborosiloxane Gel", Polymers, 2020, 13 pages.

International Search Report and Written Opinion of the International Searching Authority; PCT/US2024/029817; dated Sep. 25, 2024; 12 pages; European Patent Office.

Chinese Patent Application No. 202280031279.2, Office Action dated Jul. 30, 2025, 5 pages (English Translation only), Chinese Patent Office.

* cited by examiner

CONTAINER CLOSURE SYSTEM AND SEALING ASSEMBLIES FOR MAINTAINING SEAL INTEGRITY AT LOW STORAGE TEMPERATURES

CROSS-REFERENCE TO RELATED APPLICATIONS

This application claims the benefit of priority under 35 U.S.C. § 119 of U.S. Provisional Application Ser. No. 63/179,719 filed on Apr. 26, 2021, the content of which is relied upon and incorporated herein by reference in its entirety.

FIELD

The present specification generally relates to container closure systems, such as glass containers for storing pharmaceutical compositions.

TECHNICAL BACKGROUND

Pharmaceutical containers, such as vials and syringes, are typically sealed via a stopper or other closure to preserve the integrity of the contained material. Closures are typically made of synthetic rubbers and other elastomers. Such materials beneficially have high permeation resistance and elasticity to facilitate insertion into the container to seal the container's interior. The elasticity of typically-used closure materials, however, may reduce at low temperatures. For example, synthetic rubbers currently in use as material closures may comprise transition temperatures that are greater than or equal to −70° C. and less than or equal to −30° C. Below the transition temperature, closures constructed of such synthetic rubbers may behave as a solid and be unable to expand elastically to compensate for the relatively large difference between coefficients of thermal expansion of the glass and a crimping cap used to secure the closure to the container. Given this, existing sealing assemblies for pharmaceutical containers may fail at temperatures less than or equal to −30° C.

Some biological materials (e.g., blood, serum, proteins, stem cells, and other perishable biological fluids) require storage at temperatures below the glass transition temperatures of conventional elastomers to remain useful. For example, certain RNA-based vaccines may require storage at dry-ice temperatures (e.g., approximately −80° C.) or liquid nitrogen temperatures (e.g., approximately −180° C.) to remain active. Such low temperatures may result in dimensional changes in the closure components (e.g., the glass or polymer container, the stopper, an aluminium cap), leading to issues in the integrity of the seal, and potential contamination of the material stored therein.

SUMMARY

A first aspect of the present disclosure includes a sealed pharmaceutical container comprises a shoulder, a neck extending from the shoulder, and a flange extending from the neck. The flange comprises an underside surface extending from the neck, an outer surface extending from the underside surface, the outer surface defining an outer diameter of the flange, and a contact surface extending between the outer surface and an inner surface defining an opening in the sealed pharmaceutical container. The contact surface comprises an inner edge disposed proximate to the opening and an outer peripheral edge disposed proximate to the outer surface of the flange. The sealed pharmaceutical container comprises a sealing assembly comprising a stopper extending over the contact surface of the flange and covering the opening, and a cap securing the stopper to the flange. The stopper comprises a sealing surface that is secured in contact with the contact surface of the flange to form a seal between the flange and the stopper. An outer peripheral edge of the sealing surface is disposed at or radially inward of the outer peripheral edge of the contact surface of the flange.

A second aspect of the present disclosure includes the sealed pharmaceutical container of according to the first aspect, wherein the contact surface comprises a conical region of an upper surface of the flange.

A third aspect of the present disclosure includes the sealed pharmaceutical container of according to any of the first through the second aspects, wherein the contact surface comprises a surface roughness of less than or equal to 0.2 μm.

A fourth aspect of the present disclosure includes the sealed pharmaceutical container of according to any of the first through the third aspects, wherein the contact surface is free of surface height variations greater than or equal to 5.0 μm.

A fifth aspect of the present disclosure includes the sealed pharmaceutical container of according to any of the first through the fourth aspects, wherein the flange further comprises a fillet extending between the contact surface and the outer surface.

A sixth aspect of the present disclosure includes the sealed pharmaceutical container of according to any of the first through the fifth aspects, wherein the fillet comprises a radius of curvature that is less than or equal to 21% of a length of the contact surface of the flange.

A seventh aspect of the present disclosure includes the sealed pharmaceutical container of according to any of the first through the sixth aspects, wherein the outer peripheral edge of the sealing surface is disposed radially inward of a transition between the upper sealing surface and the fillet.

A eighth aspect of the present disclosure includes the sealed pharmaceutical container of according to any of the first through the seventh aspects, wherein the flange further comprises a chamfer extending between the contact surface and the outer surface at an angle relative to the contact surface.

A ninth aspect of the present disclosure includes the sealed pharmaceutical container of according to any of the first through the eighth aspects, wherein the angle is less than or equal to 30°.

A tenth aspect of the present disclosure includes the sealed pharmaceutical container of according to any of the first through the ninth aspects, wherein the outer peripheral edge of the sealing surface is disposed radially inward of a transition between the upper sealing surface and the chamfer.

An eleventh aspect of the present disclosure includes the sealed pharmaceutical container of according to any of the first through the tenth aspects, wherein the upper sealing surface extends at a flange angle relative to a plane extending through an end of the opening.

A twelfth aspect of the present disclosure includes the sealed pharmaceutical container of according to any of the first through the eleventh aspects, wherein the flange angle is greater than or equal to 5°.

A thirteenth aspect of the present disclosure includes the sealed pharmaceutical container of according to any of the first through the twelfth aspects, wherein the flange angle is less than or equal to 30°.

A fourteenth aspect of the present disclosure includes the sealed pharmaceutical container of according to any of the first through the thirteenth aspects, wherein: the cap comprises a metallic portion crimped around the underside surface of the flange and a plastic portion retaining an upper portion the metallic portion on an upper surface of the stopper, and an inner edge of the metallic portion is inserted into the plastic portion such that the upper portion extends at a cap angle relative to the plane extending through the end of the opening.

A fifteenth aspect of the present disclosure includes the sealed pharmaceutical container of according to any of the first through the fourteenth aspects, wherein the flange angle is within one degree of the cap angle.

A sixteenth aspect of the present disclosure includes the sealed pharmaceutical container of according to any of the first through the fifteenth aspects, wherein the stopper is compressed by the cap to provide a residual nominal strain of less than or equal to 8%.

A seventeenth aspect of the present disclosure includes the sealed pharmaceutical container of according to any of the first through the sixteenth aspects, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

An eighteenth aspect of the present disclosure includes the sealed pharmaceutical container of according to any of the first through the seventeenth aspects, wherein the sealing surface maintains a contact area of greater than or equal to 10% of a total surface area of the contact surface as the sealed pharmaceutical container is cooled to a temperature of less than or equal to −80° C.

A nineteenth aspect of the present disclosure includes a sealed pharmaceutical container comprising a shoulder; a neck extending from the shoulder; and a flange extending from the neck, The flange comprises an underside surface extending from the neck; an outer surface extending from the underside surface, the outer surface defining an outer diameter of the flange; and an upper surface extending between the outer surface and an inner surface defining an opening in the sealed pharmaceutical container. The upper surface comprises a conical region extending between the opening and the outer surface, wherein the conical region is free of surface height deviations of greater than or equal to 5 μm; and a transition region extending between the conical region and the outer surface. The sealed pharmaceutical container comprises a sealing assembly comprising: a stopper covering the opening; and cap crimped to the underside surface of the flange so as to compress a sealing surface of the stopper against the conical region such that an outer peripheral edge of the sealing surface contacts the conical region.

A twentieth aspect of the present disclosure includes a sealed pharmaceutical container according to the nineteenth aspect, wherein the contact surface comprises a Ra value of less than or equal 5 nm.

A twenty first aspect of the present disclosure includes a sealed pharmaceutical container according to any of the nineteenth through the twentieth aspects, wherein the sealing surface maintains a contact area of greater than or equal to 10% of a total surface area of the upper surface as the sealed pharmaceutical container is cooled to a temperature of less than or equal to −80° C.

A twenty second aspect of the present disclosure includes a sealed pharmaceutical container according to any of the nineteenth through the twenty first aspects, wherein the transition region comprises a fillet having a radius of curvature that is less than or equal to 21% of a width of the conical section.

A twenty third aspect of the present disclosure includes a sealed pharmaceutical container according to any of the nineteenth through the twenty second aspects, wherein the radius of curvature is less than or equal to 0.5 mm.

A twenty fourth aspect of the present disclosure includes a sealed pharmaceutical container according to any of the nineteenth through the twenty third aspects, wherein the transition region comprises a chamfer extending at an angle relative to the conical region.

A twenty fifth aspect of the present disclosure includes a sealed pharmaceutical container according to any of the nineteenth through the twenty fourth aspects, wherein the angle is less than or equal to 30°.

A twenty sixth aspect of the present disclosure includes a sealed pharmaceutical container according to any of the nineteenth through the twenty fifth aspects, wherein the conical portion extends at a flange angle relative to a plane extending through an end of the opening that is greater than or equal to 5°.

A twenty seventh aspect of the present disclosure includes a sealed pharmaceutical container according to any of the nineteenth through the twenty sixth aspects, wherein the flange angle is less than or equal to 30°.

A twenty eighth aspect of the present disclosure includes a sealed pharmaceutical container according to any of the nineteenth through the twenty seventh aspects, wherein: the cap comprises a metallic portion crimped around the underside surface of the flange and a plastic portion retaining an upper portion the metallic portion on an upper surface of the stopper, and an inner edge of the metallic portion is inserted into the plastic portion such that the upper portion extends at a cap angle relative to the plane extending through the end of the opening.

A twenty ninth aspect of the present disclosure includes a sealed pharmaceutical container according to any of the nineteenth through the twenty eighth aspects, wherein the flange angle is within one degree of the cap angle.

A thirtieth aspect of the present disclosure includes a sealed pharmaceutical container according to any of the nineteenth through the twenty ninth aspects, wherein the stopper is compressed by the cap to provide a residual nominal strain of less than or equal to 8%.

A thirty first aspect of the present disclosure includes a sealed pharmaceutical container according to any of the nineteenth through the thirtieth aspects, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

A thirty second aspect of the present disclosure includes a sealed pharmaceutical container according to any of the nineteenth through the thirty first aspects, wherein the sealing surface maintains a contact area of greater than or equal to 20 $mm^2$ with the contact surface as the sealed pharmaceutical container is cooled to a temperature of less than or equal to −80° C.

A thirty third aspect of the present disclosure includes a method of sealing a sealed pharmaceutical container, the method comprising the steps of: providing a sealed pharmaceutical container comprising a shoulder, a neck extending from the shoulder and a flange extending from the neck, the flange comprising: an underside surface extending from the neck; an outer surface extending from the underside surface, the outer surface defining an outer diameter of the flange; and an upper surface extending between the outer surface to an inner surface of the sealed pharmaceutical container that defines an opening, the upper surface comprising a conical region; inserting a pharmaceutical composition into the sealed pharmaceutical container; providing a sealing assembly comprising a stopper extending over the upper surface of the flange and covering the opening; crimping a metal-containing cap over the stopper and against flange to thereby compress the stopper against the upper surface such that an outer peripheral edge of a sealing surface of the stopper contacts the conical region; and cooling the sealed pharmaceutical container to a temperature of less than or equal to −45° C., wherein, after the cooling of the sealed pharmaceutical container, the compression is maintained on the sealing surface such that a helium leakage rate of the sealed pharmaceutical container is less than or equal to $1.4\times10^{-6}$ $cm^3/s$ at the temperature.

A thirty fourth aspect of the present disclosure includes a method according to the thirty third aspect, wherein the metal-containing cap is crimped such that the stopper is compressed against the upper surface to provide a residual nominal strain of less than or equal to 8%.

A thirty fifth aspect of the present disclosure includes a method according to any of the thirty third to the thirty fourth aspects, wherein a contact area between the sealing surface of the stopper and the upper surface of the flange is greater than or equal to 10% of a total surface area of the upper surface when the sealed pharmaceutical container is cooled to the temperature.

A thirty sixth aspect of the present disclosure includes a method according to any of the thirty third to the thirty fifth aspects, wherein the temperature is less than or equal to −80° C.

A thirty seventh aspect of the present disclosure includes a method according to any of the thirty third through the thirty sixth aspects, wherein the temperature is less than or equal to −180° C.

A thirty eighth aspect of the present disclosure includes a method according to any of the thirty third through the thirty seventh aspects, wherein: the upper surface further comprises a transition region extending between the conical region and the outer surface of the flange, and the outer peripheral edge of the sealing surface does not contact the transition region as a result of the compression of the stopper.

A thirty ninth aspect of the present disclosure includes a method according to any of the thirty third through the thirty eighth aspects, wherein the transition region comprises a fillet having a radius of curvature of less than 1.0 mm.

A fortieth aspect of the present disclosure includes a method according to any of the thirty third through the thirty ninth aspects, wherein the radius of curvature is less than or equal to 0.5 mm.

A forty first aspect of the present disclosure includes a method according to any of the thirty third through the fortieth aspects, wherein the transition region comprises a chamfer extending at an angle of less than or equal to 30° relative to the conical region.

A forty second aspect of the present disclosure includes a method according to any of the thirty third through the forty first aspects, wherein the conical region extends at a flange angle relative to a plane extending through an end of the opening that is greater than or equal to 5°.

A forty third aspect of the present disclosure includes a method according to any of the thirty third through the forty second aspects, wherein: the metal-containing cap comprises a metallic portion crimped around the underside surface of the flange and a plastic portion retaining an upper portion the metallic portion on an upper surface of the stopper, and an inner edge of the metallic portion is inserted into the plastic portion such that the upper portion extends at a cap angle relative to the plane extending through the end of the opening.

A forty fourth aspect of the present disclosure includes a method according to any of the thirty third through the forty third aspects, wherein the flange angle is within one degree of the cap angle.

A forty fifth aspect of the present disclosure includes a method according to any of the thirty third through the forty fourth aspects, wherein the sealed pharmaceutical container is cooled to the temperature at a rate of less than or equal to 3° C. per minute.

A forty sixth aspect of the present disclosure includes a glass container comprising: a shoulder; a neck extending from the shoulder; and a flange extending from the neck, the flange comprising: an underside surface extending from the neck; an outer surface extending from the underside surface, the outer surface defining an outer diameter of the flange; and an upper surface extending between the outer surface and an inner surface defining an opening in the glass container, wherein the upper surface comprises: a conical region extending between the opening and the outer surface, wherein the conical region is free of surface height deviations of greater than or equal to 5 μm; and a transition region extending between the conical region and the outer surface, wherein at least one of: the transition region comprises a chamfer extending at a chamfer angle relative to the upper surface that is less than or equal to 30° or a fillet comprising a fillet radius $r_f$ that is less than or equal to 0.8 mm, and the conical region extends at a flange angle relative to a plane extending through an end of the opening that is greater than or equal to 5°.

A forty seventh aspect includes the glass container according to the forty sixth aspect, wherein: the transition region comprises the chamfer, and the chamfer angle is less than or equal to 10°.

A forty eighth aspect of the present disclosure includes a glass container according to any of the forty sixth through the forty seventh aspects, wherein: the transition region comprises the fillet, and the fillet radius is less than or equal to 21% of a width of the conical section.

A forty ninth aspect of the present disclosure includes a glass container according to any of the forty sixth through the forty eighth aspects, wherein: the conical region extends at the flange angle relative to the plane, and the angle is greater than or equal to 5° and less than or equal to 20°.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
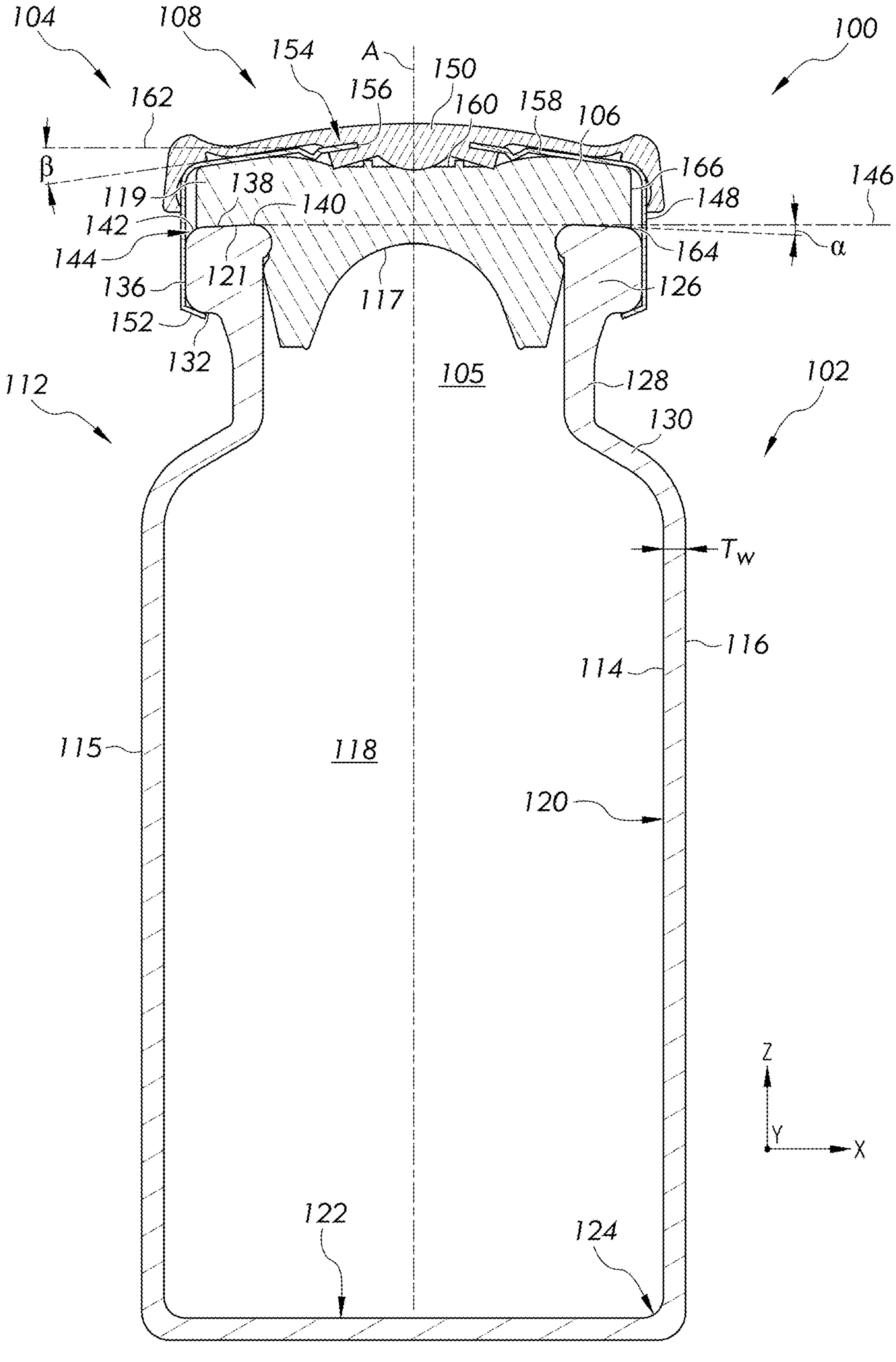
FIG. 1 schematically depicts a cross-sectional view of a sealed glass container, according to one or more embodiments described herein.

Reference will now be made in detail to embodiments of sealed pharmaceutical containers comprising sealing assemblies that maintain container closure integrity at relatively low storage temperatures (e.g., less than or equal to −30° C., less than or equal to −40° C., less than or equal to −50° C., less than or equal to −60° C., less than or equal to −70° C., less than or equal to −80° C., less than or equal to −100° C., less than or equal to −125° C., less than or equal to −150° C., less than or equal to −175° C., −180° C.). To facilitate maintenance of container closure integrity at such low storage temperatures, the sealed glass containers described herein may include a flange that is designed such that, when a crimping process is used to compress a sealing surface of a stopper against an upper surface of the flange, an outer peripheral edge of the sealing surface contacts the upper surface. The upper surface of the flange may comprise a relatively low surface roughness (e.g., comprise an Ra value of less than or equal to 5 nm) and be free of surface height variations and defects to facilitate seal formation with the stopper. In embodiments, the outer peripheral edge of the sealing surface may be disposed at or radially inward of an outer peripheral edge of the upper surface of the flange to ensure a continuous contact area between the stopper and the flange starting at the outer peripheral edge of the sealing surface. In embodiments, such positioning of the outer peripheral edge of the sealing surface in contact with the upper surface beneficially maintains a contact area between the stopper and upper surface at greater than or equal to 10% of a total surface area of the upper surface at such low storage temperatures, thereby lessening the probability of seal breakage as compared to existing glass containers. Without wishing to be bound by theory, it is believed that such placement of the outer peripheral edge of the sealing surface of the stopper facilitates more uniform compression of the stopper via capping by avoiding a concentration of compression at the outer diameter of the stopper.

Various structural modifications to existing pharmaceutical glass containers may be made to achieve the beneficial relative positioning between the outer peripheral edges of the stopper sealing surface and upper surface of the flange described herein. For example, when an outer diameter of the flange is fixed at a standard, commonly used diameter (e.g., 13 mm, 20 mm), such relative positioning may be achieved by fabricating glass containers such that a radial extent of a transition region between the upper surface of the flange and an outer surface of the flange is diminished as compared to existing pharmaceutical glass containers. In embodiments, the radial extent of the transition region is diminished by limiting a radius of curvature of a fillet extending between upper and outer surfaces of the flange to less than one-third (e.g., less than or equal to 21%) of a width of the upper surface (e.g., less than or equal to 0.8 mm, less than or equal to 0.7 mm, less than or equal to 0.6 mm, less than or equal to 0.5 mm, less than or equal to 0.4 mm, less than or equal to 0.3 mm, less than or equal to 0.2 mm). In embodiments, the radial extent of the transition region is diminished by maintaining a chamfer angle of a chamfer extending between the upper and outer surfaces to less than or equal to 30° (e.g., less than or equal to 25°, less than or equal to 20°, less than or equal to 15°, less than or equal 10°, less than or equal to 5°). In embodiments, when the outer dimeter of the flange is fixed at a standard, commonly used value, the relative positioning between the outer peripheral edges of the stopper sealing surface and the upper surface of the flange may be obtained by increasing a flange angle at which the upper surface extends relative to a plane extending through an end of an opening of the glass container over existing pharmaceutical glass containers. In embodiments, the upper surface of the flange may extend at a flange angle that is greater than or equal to 5° (e.g., 6°, 7°, 8°, 9°, 10°, 11°, 12, 13°, 14°, 15°, 16°, 17°, 18°, 19°, 20°, and any values lying between such flange angles). Such increased flange angles increase the surface area of the upper surface, thereby facilitating placement of the outer peripheral edge of the sealing surface of the stopper radially inward of the transition region between the upper surface and the outer surface.

The pharmaceutical glass containers described herein may further be beneficial over existing pharmaceutical glass containers in that they are capable of maintaining seals at low storage temperatures with lower amounts of stopper compression during crimping processes. Existing pharmaceutical containers may be sealed with crimping processes resulting in residual seal forces at the upper surfaces of the flange that are greater than 20 lbf (e.g., greater than or equal to 25 lbf, resulting in compression of the stopper that is greater than 10% and less than or equal to 20%). The improved seals provided by the pharmaceutical glass containers described herein may be capable of maintaining container closure integrity at lower residual forces (e.g., resulting in the stopper having a residual nominal strain of less than or equal to 8% after crimping). Such a reduction in residual seal force may facilitate use of more simple and efficient crimping processes, thereby lowering production costs.

As used herein, the term "surface roughness" refers to an Ra value or an Sa value. An Ra value is a measure of the arithmetic average value of a filtered roughness profile determined from deviations from a centerline of the filtered roughness. For example, an Ra value may be determined based on the relation:

$$Ra = \frac{1}{n}\sum_{i=1}^{n}|H_i - H_{CL}| \tag{1}$$

where $H_i$ is a surface height measurement of the surface and $H_{CL}$ corresponds to a centerline (e.g., the center between maximum and minimum surface height values) surface height measurement among the data points of the filtered profile. An Sa value may be determined through a real extrapolation of equation 1 herein. Filter values (e.g., cutoff wavelengths) for determining the Ra or Sa values described herein may be found in ISO ISO 25718 (2012). Surface height may be measured with a variety of tools, such as an optical interferometer, stylus-based profilometer, or laser confocal microscope. To assess the roughness of surfaces described herein (e.g., sealing surfaces or portions thereof), measurement regions should be used that are as large as is practical, to assess variability that may occur over large spatial scales.

As used herein, the term "container closure integrity" refers to maintenance of a seal at an interface between a glass container and a sealing assembly (e.g., between a sealing surface of a glass container and a stopper) that is free of gaps above a threshold size to maintain a probability of contaminant ingress or reduce the possibility of gas permeability below a predetermined threshold based on the material stored in a glass container. For example, in embodiments, a container closure integrity is maintained if a helium leakage rate during a helium leak test described in USP <1207> (2016) at less than or equal to $1.4\times10^{-6}$ $cm^3/s$.

As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the specific value or end-point referred to is included. Whether or not a numerical value or end-point of a range in the specification recites “about,” two embodiments are described: one modified by “about,” and one not modified by “about.” It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

As used herein, the singular forms “a,” “an” and “the” include plural referents unless the context clearly dictates otherwise. Thus, for example, reference to “a” component includes aspects having two or more such components, unless the context clearly indicates otherwise.

Referring now to FIG. 1, one embodiment of a sealed pharmaceutical container 100 for storing a pharmaceutical formulation is schematically depicted in cross section. The sealed pharmaceutical container 100 comprises a glass container 102 and a sealing assembly 104 coupled to the glass container 102 via an opening 105 of the glass container 102. The glass container 102 generally comprises a body 112. The body 112 extends between an inner surface 114 and an outer surface 116 of the glass container 102, includes a central axis A, and generally encloses an interior volume 118. In the embodiment of the glass container 102 shown in FIG. 1, the body 112 generally comprises a wall portion 120 and a floor portion 122. The wall portion 120 transitions into the floor portion 122 through a heel portion 124. In the depicted embodiment, the glass container 102 includes a flange 126, a neck 128 extending from the flange 126, a barrel 115, and a shoulder 130 extending between the neck 128 and the barrel 115. In embodiments, the glass container 102 is symmetrical about a central axis A, with each of the barrel 115, neck 128, and flange 126, being substantially cylindrical-shaped. The body 112 has a wall thickness $T_W$ which extends between the inner surface 114 to the outer surface 116, as depicted in FIG. 1.

In embodiments, the glass container 102 may be formed from Type I, Type II or Type III glass as defined in USP <660>, including borosilicate glass compositions such as Type 1B borosilicate glass compositions under USP <660>. Alternatively, the glass container 102 may be formed from alkali aluminosilicate glass compositions such as those disclosed in U.S. Pat. No. 8,551,898, hereby incorporated by reference in its entirety, or alkaline earth aluminosilicate glasses such as those described in U.S. Pat. No. 9,145,329, hereby incorporated by reference in its entirety. In embodiments, the glass container 102 may include a coating such as a heat tolerant coating disclosed in U.S. Pat. No. 100,273,049, hereby incorporated by reference in its entirety. In embodiments, the glass container 102 may be constructed from a soda lime glass composition. In embodiments, the glass container 102 is constructed of a glass composition having a coefficient of thermal expansion that is greater than or equal to $0\times10^{-7}$/K and less than or equal to $100\times10^{-7}$/K (e.g., greater than or equal to $30\times10^{-7}$/K and less than or equal to $70\times10^{-7}$/K).

While the glass container 102 is depicted in FIG. 1 as having a specific form-factor (i.e., a vial), it should be understood that the glass container 102 may have other form factors, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

The wall thickness $T_W$ of the glass container 102 may vary depending on the implementation. In embodiments, the wall thickness $T_W$ of the glass container 102 may be from less than or equal to 6 millimetres (mm), such as less than or equal to 4 mm, less than or equal to 2 mm, less than or equal to 1.5 mm or less than or equal to 1 mm. In some embodiments, the wall thickness $T_W$ may be greater than or equal to 0.1 mm and less than or equal to 6 mm, greater than or equal to 0.3 mm and less than or equal to 4 mm, greater than or equal to 0.5 mm and less than or equal to 4 mm, greater than or equal to 0.5 mm and less than or equal to 2 mm, or greater than or equal to 0.5 mm and less than or equal to 1.5 mm. In embodiments, the wall thickness $T_W$ may be greater than or equal to 0.9 mm and less than or equal to 1.8 mm. The wall thickness $T_W$ may vary depending on the axial location within the glass container 102.

As depicted in FIG. 1, the flange 126 comprises an underside surface 132, an outer surface 136, and an upper surface 138. The outer surface 136 may define an outer diameter of the flange 126. In embodiments, the outer diameter is 13 mm, 20 mm or between 13 mm and 20 mm. In embodiments, the upper surface 138 is a conical surface comprising an inner edge 140 (e.g., delineating a boundary of the opening 105) and an outer peripheral edge 142. In embodiments, the upper surface 138 of the flange 126 comprises an upper surface of the glass container 102 extending between the inner edge 140 and the outer peripheral edge 142. The inner and outer edges 140 and 142 may mark transition points where the exterior surface of the glass container 102 deviates from a conical surface by more than surface height variations associated with a surface roughness of the upper surface 138. In embodiments, the upper surface 138 comprises a relatively low surface roughness (e.g., an Ra value of less than or equal 5 nm) and is free of surface defects and surface height deviations of greater than or equal to 5 μm from the conical surface. Such uniformity of the upper surface 138 beneficially facilitates maintaining contact between the upper surface 138 and a stopper (e.g., the stopper 106 described herein) to maintain a seal when the glass container 102 is cooled to relatively low temperatures (e.g., to less than or equal to −45° C., less than or equal to −80° C., less than or equal to −180° C.). In embodiments, the sealed pharmaceutical containers may be cooled to the low storage temperatures described herein at rates of less than or equal to 3° C. per minute.

In embodiments, the flange 126 further comprises a transition region 144 extending between the upper surface 138 and the outer surface 136. In embodiments, within the transition region 144, the outer surface 116 of the glass container 102 deviates from the conical surface followed by the upper surface 138 and a second surface (e.g., cylindrical surface) followed by the outer surface 136. The transition region 144 may take a variety of forms depending on the implementation. In embodiments, the transition region 144 comprises a corner such that the outer surface 116 directly transitions from the upper surface 138 to the outer surface 136. In embodiments, the transition region 144 comprises a chamfer extending at a chamfer angle from the upper surface 138. In embodiments, the transition region 144 comprises a fillet comprising a radius of curvature ($r_f$). As will be described in greater detail herein, the relative positioning of the transition region 144 and a sealing surface of a stopper (e.g., the stopper 106 described herein) is an important factor to ensure that the sealed pharmaceutical container 100 maintains closure integrity at relatively low storage temperatures.

In embodiments, each cross-section of the upper surface 138 of the flange 126 extends at a flange angle α relative to a plane 146 extending through an end of the opening 105 of the glass container 102. In embodiments, the plane 146 contacts (e.g., lies on top of) a most distant portion of the glass container 102 from the floor portion 122 along the axis A. In embodiments, the most distant portion comprises the inner edge 140 of the upper surface 138 of the flange 126. In embodiments, the plane 146 extends perpendicular to the axis A. As described in greater detail herein, the greater the flange angle α, the greater the surface area of the upper surface 108, which renders the transition region 144 more distant from the inner edge 140 along the upper sealing surface 146. As described in greater detail herein, such distance between the transition region 144 and the inner edge 140 may beneficially ensure an outer peripheral edge of a sealing surface of a stopper is disposed radially inward of the transition region 144, which may ensure maintenance of container closure integrity at relatively low storage temperatures. In embodiments, the flange angle α may vary between −2° and 30° depending on the implementation.

Referring still to FIG. 1, the sealing assembly 104 comprises a stopper 106 and a cap assembly 108. The stopper 106 may be constructed of a suitable elastomeric material (e.g., Butyl rubber). In the embodiment depicted in FIG. 1, the stopper 106 comprises an insertion portion 117 and a sealing portion 119 comprising a sealing surface 121. The insertion portion 117 is inserted into the opening 105 of the glass container 102 until the sealing surface 121 contacts an upper sealing surface (e.g., the upper surface 138 of the flange 126) of the glass container 102. The sealing portion 119 is then pressed against the upper surface 138 via crimping the cap assembly 108 to form a seal between the sealing surface 121 and the upper surface 138 of the flange 126.

The cap assembly 108 is depicted to include a metallic portion 148 and a plastic portion 150. The metallic portion 148 is crimped around the underside surface 132 of the flange 126 such that an underlying portion 152 thereof contacts the underside surface 132. In embodiments, the length of the underlying portion 152 of the metallic portion 148 that directly contacts the underside surface 132 of the flange 126 possesses a length (e.g., in the X-direction depicted in FIG. 1) that is greater than or equal to 1 mm to facilitate maintenance of residual sealing force within the stopper 106 at storage temperatures of less than or equal to −80° C. In embodiments, the plastic portion 150 includes a retention feature 154 (e.g., a slot, cavity, dip, hole, or the like) receiving an inner edge 156 of the metallic portion 148 to retain an upper portion 158 of the metallic portion 148 on an upper surface 160 of the stopper 106. In embodiments, the retention feature 154 of the plastic portion 150 is oriented such that the upper portion 158 extends at a cap angle α relative to a plane 162 extending perpendicular to the axis A. The cap angle β beneficially ensures a downward compression against the upper surface 160 of the stopper 106 to compress the sealing surface 121 against the upper surface 138 and facilitate seal formation.

In embodiments, during the crimping process, the stopper 106 is inserted into the opening 105 and a compression force is applied to the metallic portion 148 during crimping. Compression of the stopper 106 generates a residual sealing force within the flange 126 that maintains compression on the stopper 106 after the metallic portion 148 is crimped into place. In embodiments, the residual seal force may vary from 5 lbf to 25 lbf and result in nominal stopper strains between 5% and 19%.

In embodiments, various aspects of the glass container 102 and cap assembly 108 have been designed to maintain container closure integrity at relatively low storage temperatures. As depicted in FIG. 1, the sealing surface 121 of the stopper 106 comprises an outer peripheral edge 164. In embodiments, the outer peripheral edge 164 marks a transition between the sealing surface 121 and an outer surface 166 of the stopper 106. As will be appreciated, the sealing surface 121 and the outer surface 166 of the stopper 106 represent portions of an exterior surface shape of the stopper 106 when the stopper 106 is compressed against the glass container 102 via the cap assembly 108. As such, exact ending points of the various surfaces (e.g., the sealing surface 121 and the outer surface 166) of the stopper 106 described herein with respect to FIG. 1 may not exactly correspond to the shape of the stopper 106 when in an uncompressed state. That is, the precise shape of the stopper 106 may vary from that depicted in FIG. 1A when in an uncompressed state.

In embodiments, the glass container 102 is shaped such that, when the stopper 106 is compressed against the upper surface 138 of the flange 126 via the cap assembly 108, the outer peripheral edge 164 of the sealing surface 121 lies at or radially inward (e.g., with respect to the axis A) of the transition region 144 extending between the upper surface 138 and the outer surface 136 of the flange 126. That is, after the sealing portion 119 is compressed between the upper portion 158 and the upper surface 138, the outer peripheral edge 164 (e.g., the portion of the sealing surface 121 that is disposed most radially outward from the axis A) is disposed at or radially inward of the transition region 144. In embodiments, the glass container 102 is shaped such that, when the stopper 106 is compressed against the upper surface 138 of the flange 126 via the cap assembly 108, the outer peripheral edge 164 of the sealing surface is in contact with the upper surface 138 of the flange 126. In embodiments, no portion of the sealing surface 121 contacts the transition region 144. Without wishing to be bound by theory, it is believed that keeping the sealing surface 121 from contacting the transition region 144 prevents deformation of the sealing portion 119 that may reduce a contact area between the sealing surface 121 and the upper surface 138 of the flange 126.

While maintaining the outer peripheral edge 164 at or radially inward of the transition region 144 may be achieved by reducing the radial extent of the stopper 106 (e.g., making the stopper 106 smaller), such an alteration to the stopper 106 would detrimentally reduce a contact area between the upper surface 138 and the stopper 106, reducing the quality of the seal. As such, by eliminating the need to modify the shape of the stopper 106, the structures of the glass container 102 described herein beneficially maximize a contact area between the stopper 106 and the upper surface 138. Moreover, the glass containers described herein are compatible with existing capping processes, eliminating the need to alter existing production lines. Various structural aspects of the flange 126 will now be described in greater detail.

Figure 2A:
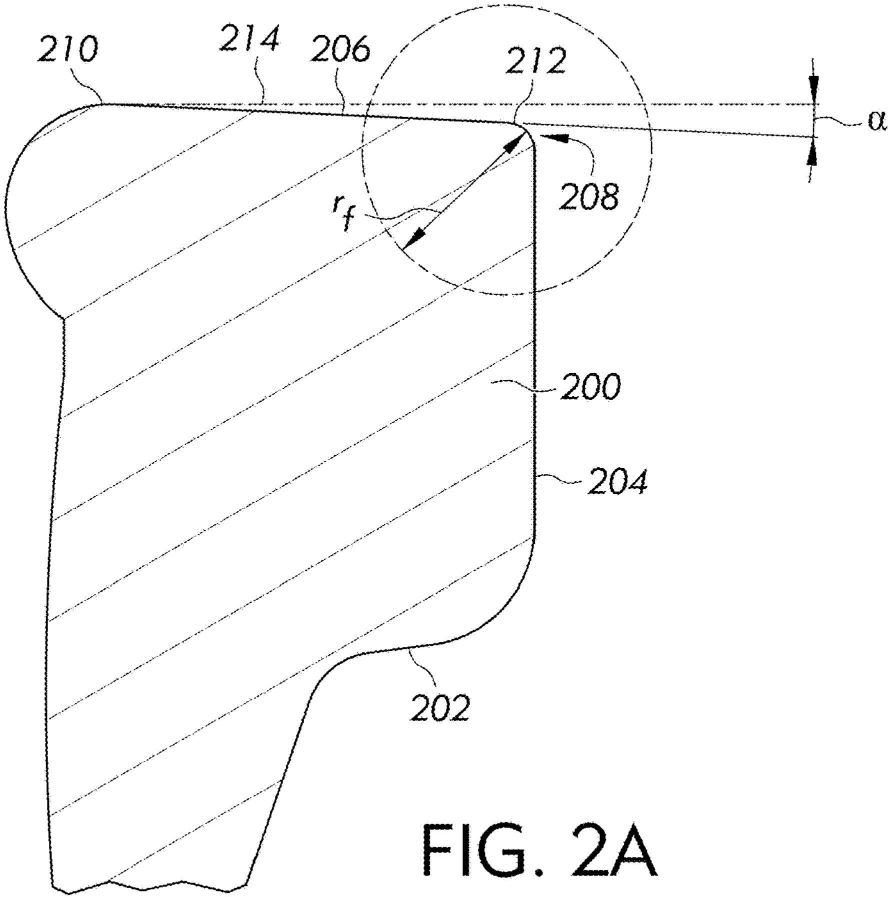
FIG. 2A schematically depicts a portion of a glass container including a fillet extending between upper and outer surfaces of a flange, according to one or more embodiments described herein.

Referring now to FIG. 2A, a portion of a flange 200 of a glass container is schematically depicted. The flange 200 depicted in FIG. 2A may be similar in structure to the flange 126 of the glass container 102 described herein with respect to FIG. 1. In embodiments, the flange 200 may be used in place of the flange 126 in the sealed pharmaceutical container 100 described herein with respect to FIG. 1. As depicted in FIG. 2A, the flange 200 comprises an underside surface 202, an outer surface 204 extending from the underside surface 202, and an upper surface 206. The outer surface 204 defines an outer diameter of the flange 200, which may be 13 mm, 20 mm or between 13 mm and 20 mm, in some embodiments. The upper surface 206 is a conical surface extending at a flange angle α relative to a plane 214 extending through an end of an opening in the glass container (e.g., lying on an inner edge 210 of the upper surface 206). In the embodiment depicted in FIG. 2A, the flange angle α may be greater than or equal to 1° and less than or equal to 5°. The upper surface 206 comprises the inner edge 210 and an outer peripheral edge 212. In embodiments, the inner edge 210 delineates a boundary of an opening in the glass container (e.g., corresponding to the opening 105 described herein with respect to FIG. 1). The flange 200 further comprises a transition region 208 extending between the upper surface 206 and the outer surface 204.

As depicted in FIG. 2A, the transition region 208 comprises a fillet with a reduced fillet radius $r_f$ as compared to existing glass containers. In embodiments, the fillet radius $r_f$ is less than or equal to 21% of a width of the upper surface 206 (e.g., a distance between in the inner edge 210 and an outer peripheral edge 212 along the upper surface 206). In embodiments, the fillet radius $r_f$ is less than 1.0 mm (e.g., less than or equal to 0.8 mm, less than or equal to 0.5 mm, less than or equal to 0.4 mm, less than or equal to 0.3 mm, less than or equal to 0.2 mm). Reducing the fillet radius $r_f$ beneficially reduces the extent that the transition region 208 extends radially inward from the outer surface 204, thereby ensuring that an outer peripheral edge of a sealing surface of a stopper is disposed radially inward of the transition region 208 and/or contacts the upper surface 206.

Figure 2B:
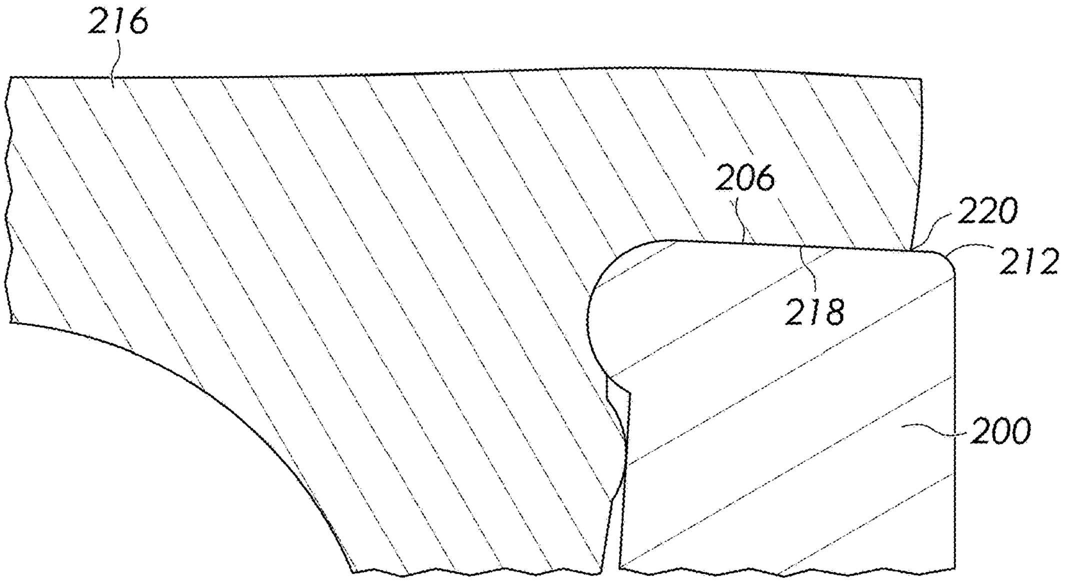
FIG. 2B schematically depicts a portion of a stopper compressed against the upper surface of the flange depicted in FIG. 2A, according to one or more embodiments described herein.

FIG. 2B schematically depicts a portion of a compressed stopper 216 crimped against the upper surface 206 of the flange 200. In embodiments, the compressed stopper 216 corresponds to the stopper 106 that is compressed via the cap assembly 108 described herein with respect to FIG. 1. The cap assembly 108 is omitted in FIG. 2B for purposes of clarity. As depicted in FIG. 2B, the compressed stopper 216 comprises a sealing surface 218 that is compressed against the upper surface 206 of the flange 200. The sealing surface 218 comprises an outer peripheral edge 220 that is disposed radially inward of the outer peripheral edge 212 of the upper surface 206. As a result of the reduced filled radius $r_f$ of the transition region 208 (see FIG. 2A), the sealing surface 218 does not contact the transition region 208, which beneficially facilitates maintaining a contact area between the sealing surface 218 and the upper surface 206 of the flange greater than or equal to 10% of a total surface area of the upper surface 206 (e.g., greater than or equal to 20 $mm^2$ in the case that the flange 200 has an outer diameter of 20 mm) irrespective of the glass container being cooled to storage temperatures of less than or equal to −80°.

Figure 3A:
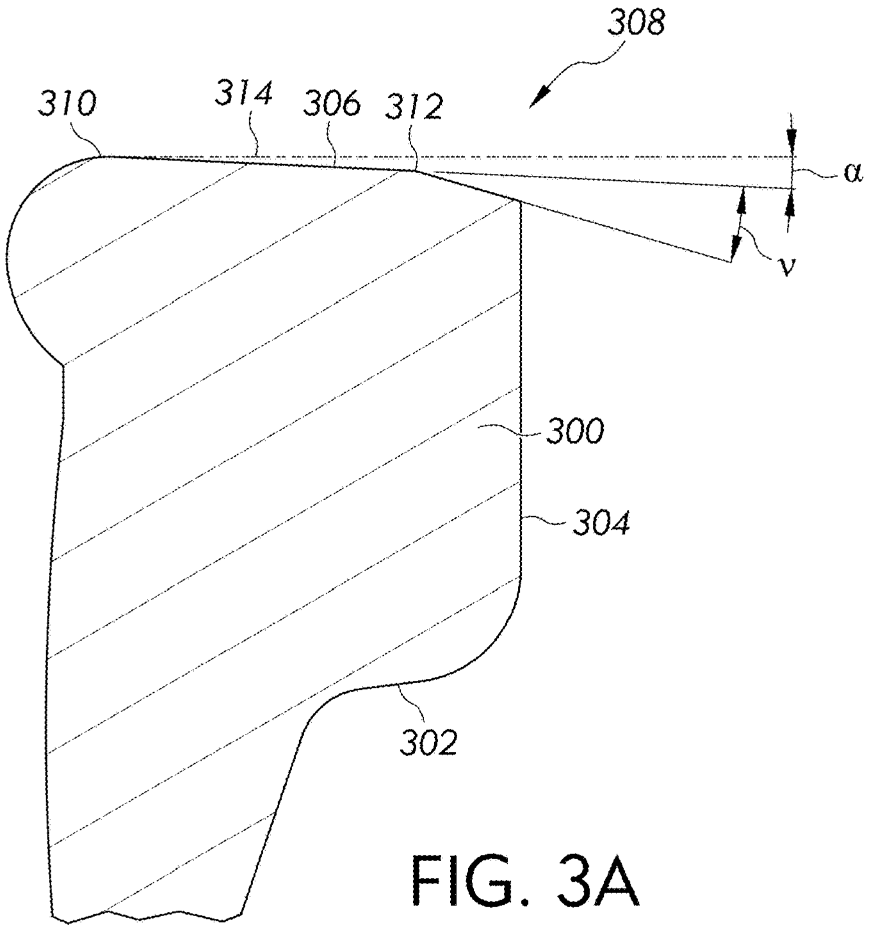
FIG. 3A schematically depicts a portion of a portion of a glass container including a chamfer extending between upper and outer surfaces of a flange, according to one or more embodiments described herein.

Referring now to FIG. 3A, a portion of a flange 300 of a glass container is schematically depicted. The flange 300 depicted in FIG. 3A may be similar in structure to the flange 126 of the glass container 102 described herein with respect to FIG. 1. In embodiments, the flange 300 may be used in place of the flange 126 in the sealed pharmaceutical container 100 described herein with respect to FIG. 1. As depicted in FIG. 3A, the flange 300 comprises an underside surface 302, an outer surface 304 extending from the underside surface 302, and an upper surface 306. The outer surface 304 defines an outer diameter of the flange 300, which may be 13 mm, 20 mm or between 13 mm and 20 mm in some embodiments. The upper surface 306 is a conical surface extending at a flange angle α relative to a plane 314 extending through an end of an opening in the glass container (e.g., lying on an inner edge 310 of the upper surface 306). In the embodiment depicted in FIG. 3A, the flange angle α may be greater than or equal to 1° and less than or equal to 5°. The upper surface 306 comprises the inner edge 310 and an outer peripheral edge 312. In embodiments, the inner edge 310 delineates a boundary of an opening in the glass container (e.g., corresponding to the opening 105 described herein with respect to FIG. 1). The flange 300 further comprises a transition region 308 extending between the upper surface 306 and the outer surface 304.

As depicted in FIG. 3A, the transition region 308 comprises a chamfer extending at a chamfer angle ν relative to the upper surface 306. In existing glass containers, the chamfer angle ν may be approximately equal to 45°. In the depicted embodiment, the chamfer angle ν may be less than or equal to 30° (e.g., less than or equal to 25°, less than or equal to 20°, less than or equal to 15°, less than or equal to 10°, less than or equal to 5°). Reducing the chamfer angle ν beneficially reduces the extent that the transition region 308 extends radially inward from the outer surface 304, thereby ensuring that an outer peripheral edge of a sealing surface of a stopper is disposed radially inward of the transition region 308 and/or contacts the upper surface 306.

Figure 3B:
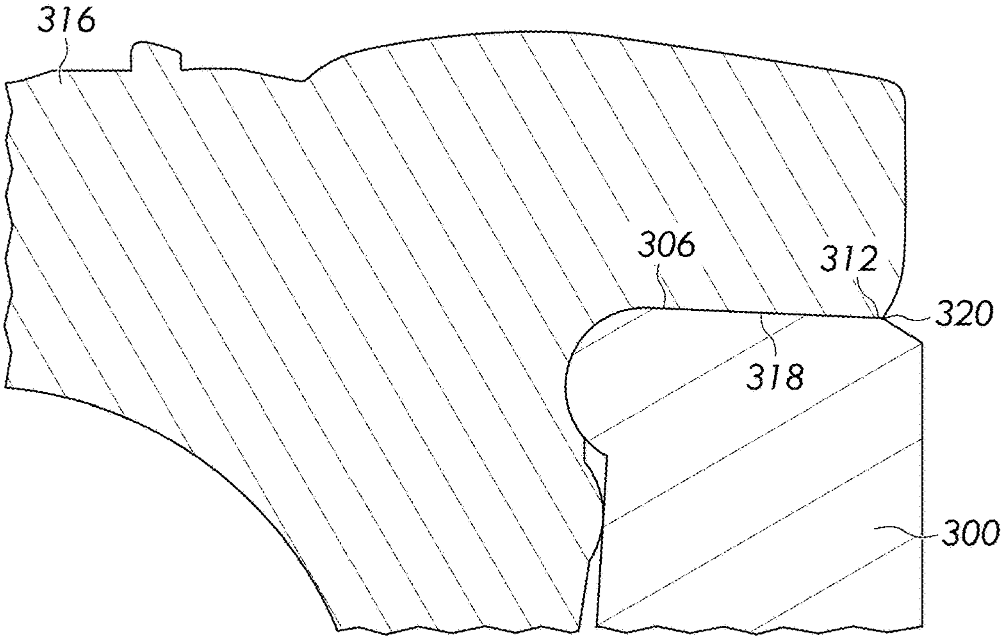
FIG. 3B schematically depicts a portion of a stopper compressed against the upper surface of the flange depicted in FIG. 3A, according to one or more embodiments described herein.

FIG. 3B schematically depicts a portion of a compressed stopper 316 crimped against the upper surface 306 of the flange 300. In embodiments, the compressed stopper 316 corresponds to the stopper 106 that is compressed via the cap assembly 108 described herein with respect to FIG. 1. The cap assembly 108 is omitted in FIG. 3B for purposes of clarity. As depicted in FIG. 3B, the compressed stopper 316 comprises a sealing surface 318 that is compressed against the upper surface 306 of the flange 300. The sealing surface 318 comprises an outer peripheral edge 320 that is disposed at or radially inward of the outer peripheral edge 312 of the upper surface 306. As a result of the reduced chamfer angle ν of the transition region 308 (see FIG. 3A), the sealing surface 318 does not contact the transition region 308, which beneficially facilitates maintaining a contact area between the sealing surface 318 and the upper surface 306 of the flange greater than or equal to 10% of the total surface area of the upper surface 306 irrespective of the glass container being cooled to storage temperatures of less than or equal to −80°.

Figure 4A:
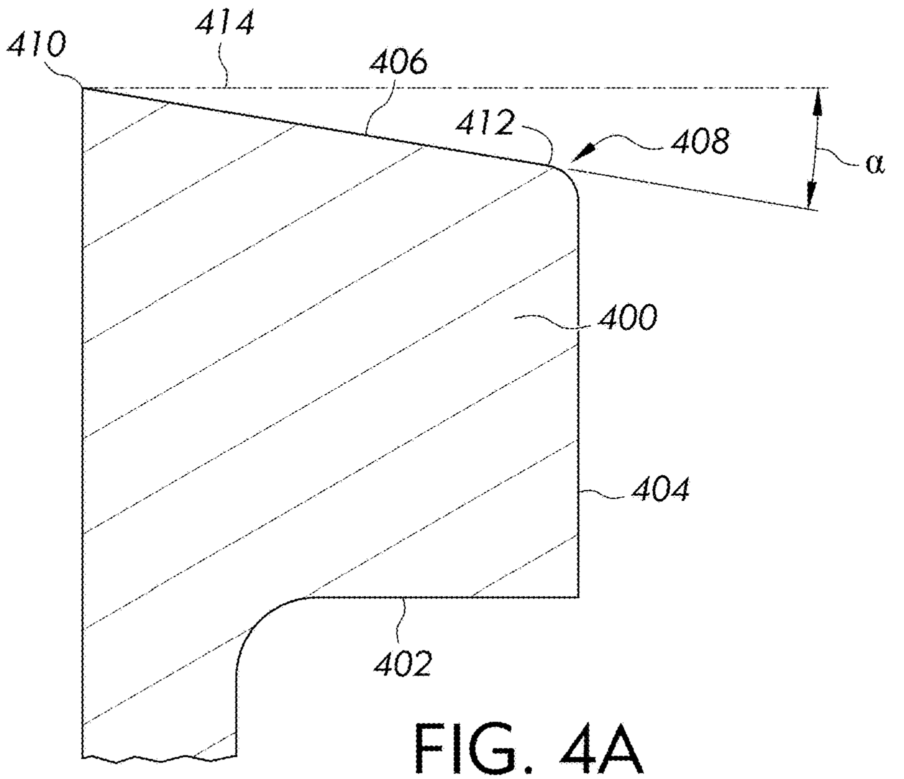
FIG. 4A schematically depicts a portion of a glass container including an upper surface extending at a flange angle to a plane extending through an end of an opening of the glass container, according to one or more embodiments described herein.

Referring now to FIG. 4A, a portion of a flange 400 of a glass container is schematically depicted. The flange 400 depicted in FIG. 4A may be similar in structure to the flange 126 of the glass container 102 described herein with respect to FIG. 1. In embodiments, the flange 400 may be used in place of the flange 126 in the sealed pharmaceutical container 100 described herein with respect to FIG. 1. As depicted in FIG. 4A, the flange 400 comprises an underside surface 402, an outer surface 404 extending from the underside surface 402, and an upper surface 406. The outer surface 404 defines an outer diameter of the flange 400, which may be 13 mm, 20 mm, or between 130 m and 20 mm in some embodiments. The upper surface 406 comprises the inner edge 410 and an outer peripheral edge 412. In embodiments, the inner edge 410 delineates a boundary of an opening in the glass container (e.g., corresponding to the opening 105 described herein with respect to FIG. 1). The flange 400 further comprises a transition region 408 extending between the upper surface 406 and the outer surface 404. The transition region 408 may take a variety of forms (e.g., a chamfer, a fillet, a corner) depending on the implementation.

As depicted in FIG. 4A, the upper surface 406 of the flange 400 extends at flange angle α relative to a plane 414 extending through an end of an opening (e.g., corresponding to the opening 105 of the glass container 102 described with respect to FIG. 1). The flange angle α of the flange 400 may be larger than those associated with existing glass containers. Existing glass containers may include flange angles ranging between 1° and 5°. In the embodiment depicted in FIG. 4B, the flange angle α is greater than 5° (e.g., 6°, 7°, 8°, 9°, 10°, 11°, 12, 13°, 14°, 15°, 16°, 17°, 18°, 19°, 20°, and any values lying between such flange angles). In embodiments the flange angle α is less than or equal to 30°. Flange angles above this may diminish compression of the stopper 106 due to the increased distance between the sealing surface 121 and the upper portion 158 at the outer peripheral edge 164, reducing contact area. In embodiments, it is particularly beneficial to maintain the flange angle α to less than or equal to 10° to provide adequate compression of the stopper 106 to maintain a suitable contact area. The greater flange angle α of the embodiment depicted in FIG. 4A beneficially increases the surface area of the upper surface 406 and facilitates placement of an outer peripheral edge of a stopper sealing surface at or radially inward of the transition region 408.

Figure 4B:
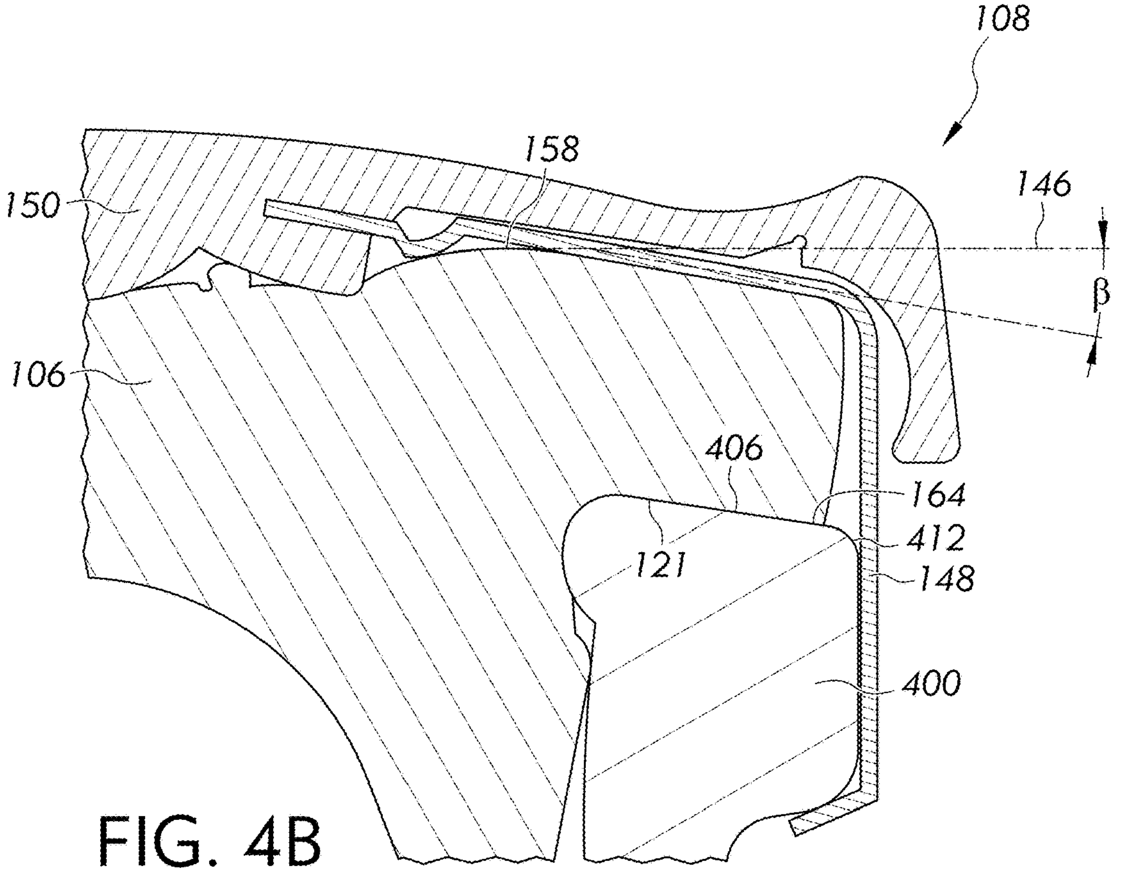
FIG. 4B schematically depicts a portion of a stopper compressed against the upper surface of the glass container depicted in FIG. 4A, according to one or more embodiments described herein.

FIG. 4B schematically depicts the stopper 106 described herein with respect to FIG. 1 crimped against the flange 400 using the cap assembly 108 described herein with respect to FIG. 1. As depicted, the increased flange angle α of the upper surface 406 (see FIG. 4A) results in the outer peripheral edge 164 of the sealing surface 121 being disposed radially inward of the outer peripheral edge 412 of the upper surface 406. As depicted in FIG. 4B, upper portion 158 of the metallic portion 148 of the cap assembly 108 extends at a cap angle β relative to the plane 146 extending perpendicular to the central axis A (see FIG. 1). In embodiments, the flange angle α of the upper surface 406 is within one degree of the cap angle β. Without wishing to be bound by theory, it is believed that a correspondence between the flange angle α and the cap angle β beneficially provides a uniform compression of the sealing surface 121 against the upper surface 406 to facilitate maintaining a relatively high contact area between the stopper 106 and the flange 400 irrespective of storage temperature.

Referring to FIGS. 1-4B, the structural modifications to existing glass containers (e.g., reduced chamfer angles, reduced fillet radii, increase flange angles, or any combination thereof) described herein facilitate using existing capping processes associated with currently used flange outer diameters (e.g., 20 mm, 13 mm). It should be appreciated that glass containers are also envisioned having flange outer diameters (e.g., defined by the outer surface 136 of the flange 126, see FIG. 1) that are greater than those currently used in existing glass containers. For example, in embodiments, the outer surface 136 of the flange 126 of the glass container 102 of FIG. 1 may define an outer diameter of 20.2 mm, 20.4 mm. 20.5 mm, 21 mm, 22 mm, or greater. In embodiments, the outer surface 136 of the flange 126 of the glass container 102 of FIG. 1 may define an outer diameter of 13.2 mm, 13.4 mm, 13.6 mm, 13.8 mm, 14.0 mm, or greater. Such greater outer diameters may be used in conjunction with existing flange angles and transition regions (e.g., fillets and chamfer angles) while maintaining the beneficial relative positioning between the outer peripheral edge 164 and the outer peripheral edge 142 of the upper surface 138 described herein with respect to FIG. 1.

Figure 5A:
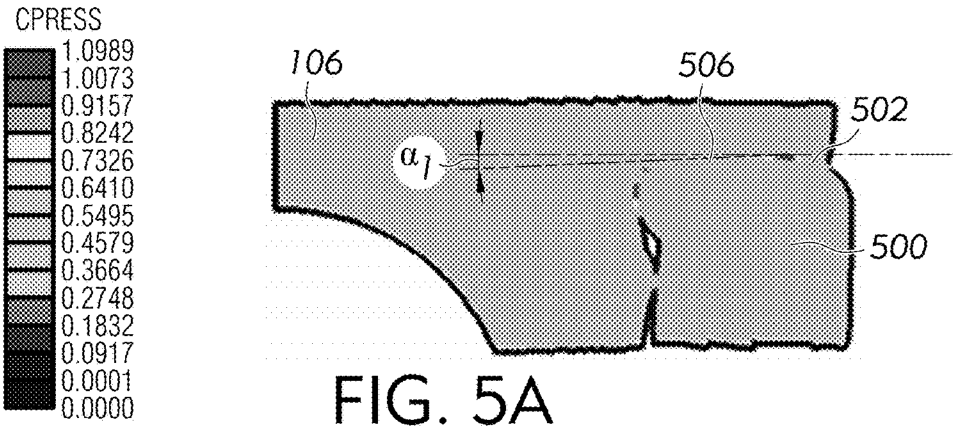
FIG. 5A depicts simulation results of a portion of a stopper compressed against an upper surface of a first glass container including an upper surface of a flange that extends at a first flange angle from a plane extending through an end of the opening of the first glass container, according to one or more embodiments described herein.
Figure 5B:
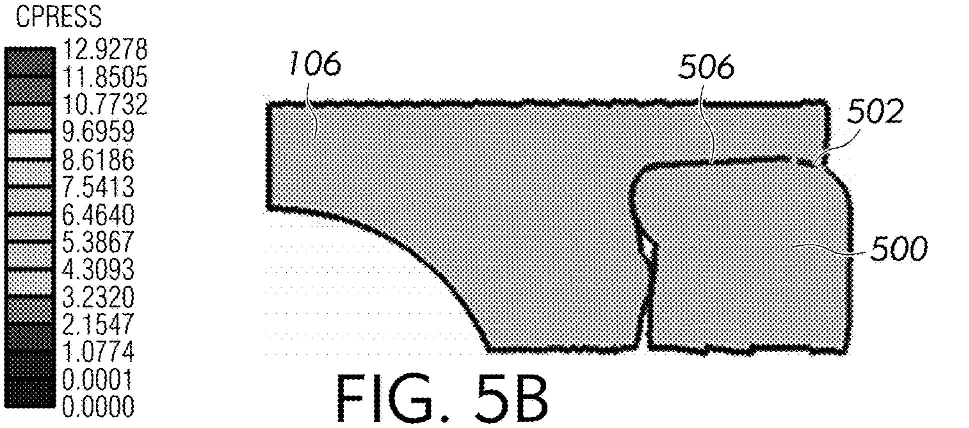
FIG. 5B depicts simulation results of a portion of a stopper compressed against the upper surface of the flange of the first glass container of FIG. 5A when cooled to a temperature of −80° C., according to one or more embodiments described herein.
Figure 5C:
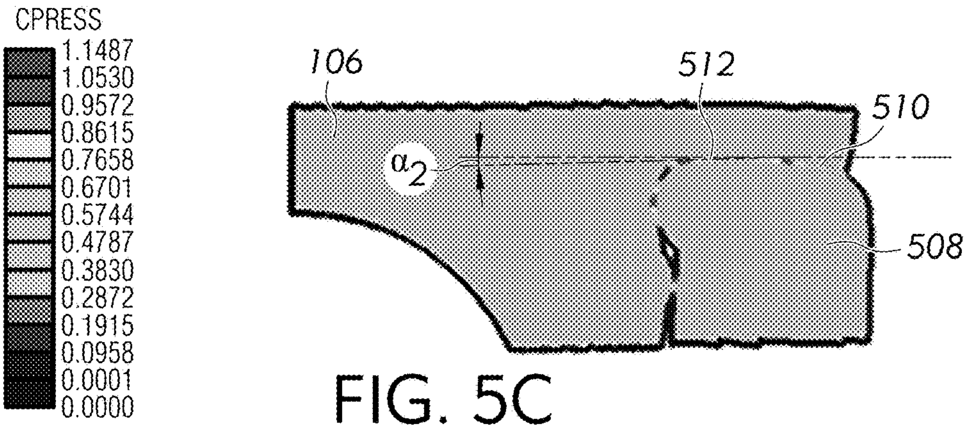
FIG. 5C depicts simulation results of a portion of a stopper compressed against an upper surface of a flange a second glass container that extends at a second flange angle from a plane extending through an end of the opening of the second glass container, according to one or more embodiments described herein.
Figure 5D:
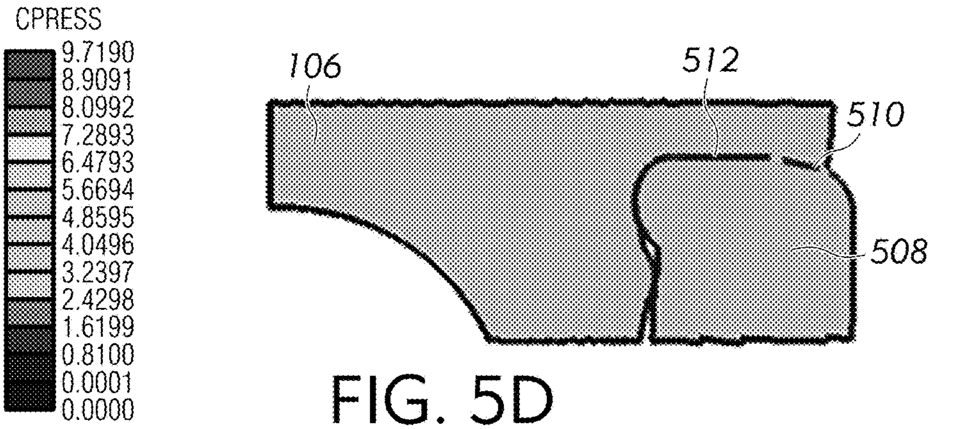
FIG. 5D depicts simulation results of a portion of a stopper compressed against the upper surface of the second glass container of FIG. 5C when cooled to a temperature of −80° C., according to one or more embodiments described herein.
Figure 5E:
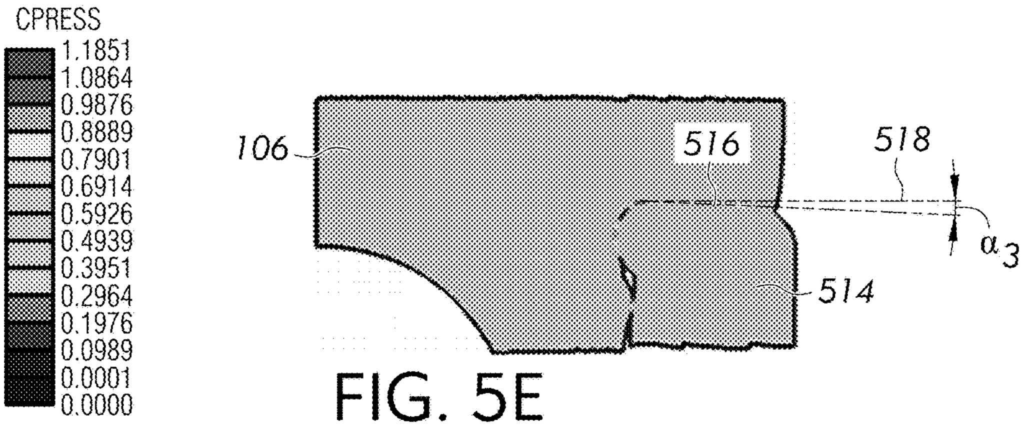
FIG. 5E depicts simulation results of a portion of a stopper compressed against an upper surface of a flange of a third glass container that extends at a third flange angle from a plane extending through an end of the opening of the third glass container, according to one or more embodiments described herein.
Figure 5F:
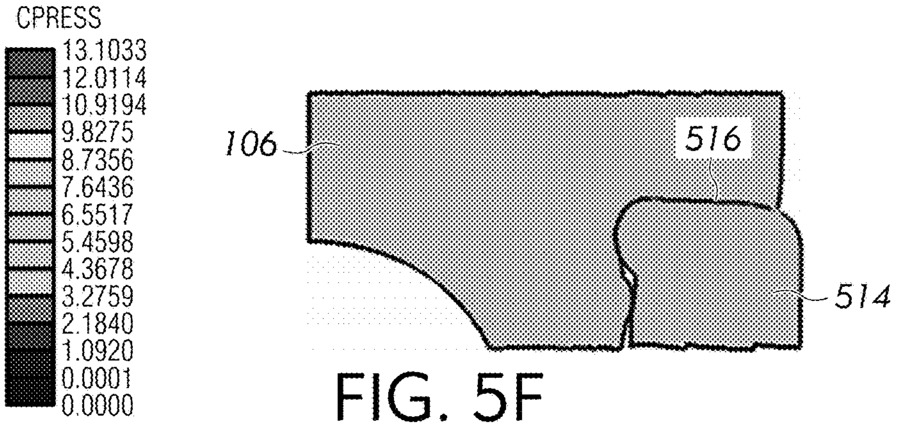
FIG. 5F depicts simulation results of a portion of a stopper compressed against the upper surface of the third glass container of FIG. 5E when cooled to a temperature of −80° C., according to one or more embodiments described herein.
Figure 5G:
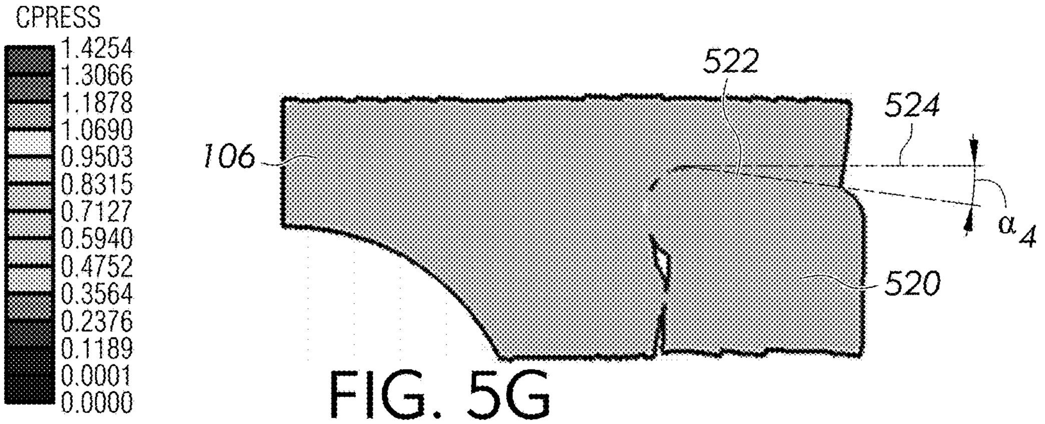
FIG. 5G depicts simulation results of a portion of a stopper compressed against an upper surface of a flange of a fourth glass container that extends at a fourth flange angle from a plane extending through an end of the opening of the fourth glass container, according to one or more embodiments described herein.
Figure 5H:
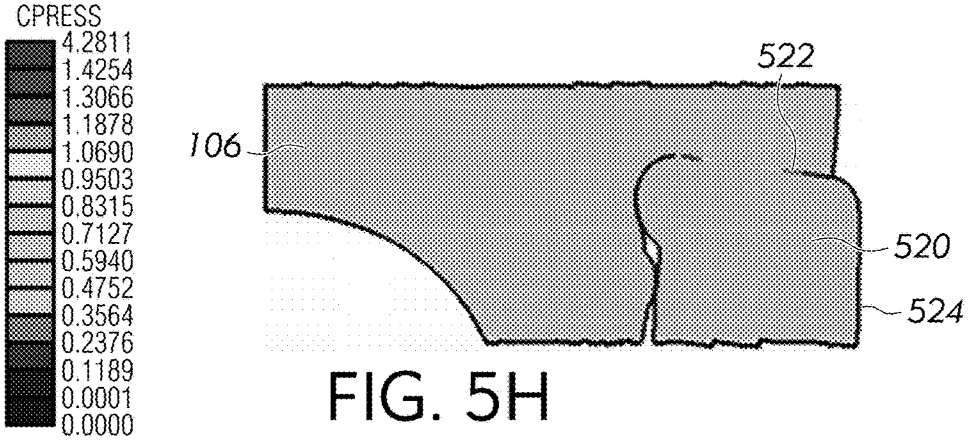
FIG. 5H depicts simulation results of a portion of a stopper compressed against the upper surface of the fourth glass container of FIG. 5G when cooled to a temperature of −80° C., according to one or more embodiments described herein.

FIGS. 5A-5H depict simulation results of stopper compression as a function of flange angle. FIGS. 5A and 5B depict results of a simulation predicting a compression of the stopper 106 described herein with respect to FIG. 1 by the cap assembly 108 (not depicted) against a flange 500 having an upper surface 502 extending at a flange angle $\alpha_1$=−3° relative to a plane 506 lying on top of the flange 500 at 25° C. and −80° C., respectively. FIGS. 5C and 5D depict results of a simulation predicting a compression of the stopper 106 described herein with respect to FIG. 1 by the cap assembly 108 (not depicted) against a flange 508 having an upper surface 510 extending at a flange angle $\alpha_2$=0° relative to a plane 512 lying on top of the flange 508 at 25° C. and −80° C., respectively. FIGS. 5E and 5F depict results of a simulation predicting a compression of the stopper 106 described herein with respect to FIG. 1 by the cap assembly 108 (not depicted) against a flange 514 having an upper surface 516 extending at a flange angle $\alpha_3$=2.4° relative to a plane 518 lying on top of the flange 514 at 25° C. and −80° C., respectively. FIGS. 5G and 5H depict results of a simulation predicting a compression of the stopper 106 described herein with respect to FIG. 1 by the cap assembly 108 (not depicted) against a flange 520 having an upper surface 522 extending at a flange angle $\alpha_4$=8.04° relative to a plane 524 lying on top of the flange 520 at 25° C. and −80° C., respectively.

The simulations depicted in FIGS. 5A-5H predict the compression of the stopper 106 against the flanges 500, 508, 514, and 520 respectively when crimped via the cap assembly 108 (not depicted) to provide a residual sealing force of approximately 25 lbf (e.g., greater than or equal to 24.7 lbf and less than or equal 25.6 lbf). Finite element analysis was then performed to simulate compression of the stopper 106 against each of the flanges 500, 508, 514, and 520 at 25° and −80° C. As shown in FIGS. 5A, 5C, 5E, and 5G, each of the flanges 500, 508, 514, and 520 maintained a continuous area of compression extending over entire lengths of the upper surfaces 502, 510, 516, and 522 at 25° C., respectively. At −80° C., in contrast, decompression of the stopper 106 resulted in significant breakages (e.g., areas where the compression is less than 0.0001 MPa) in the compression between the stopper 106 and the flanges 500, 508, and 514. In this example, the flange 520, including the flange angle $\alpha_4$ that is greater than 5°, maintained the continuous area of compression extending over the entire length of the upper surface 522 at −80° C. Without wishing to be bound by theory, it is believed that the continuous area of compression is maintained by the flange 520 due to the increased surface area of the upper surface 522, which beneficially results in an offset between the outer peripheral edge 164 (see FIG. 1) and a transition between the upper surface 522 and an outer surface 524 of the flange 520 (see FIG. 5H), thereby avoiding concentration of the compression of the stopper 106 at the outer edge of the upper surface 522. These simulation results verify the efficacy of the modifications of existing pharmaceutical containers described herein.

Figure 6A:
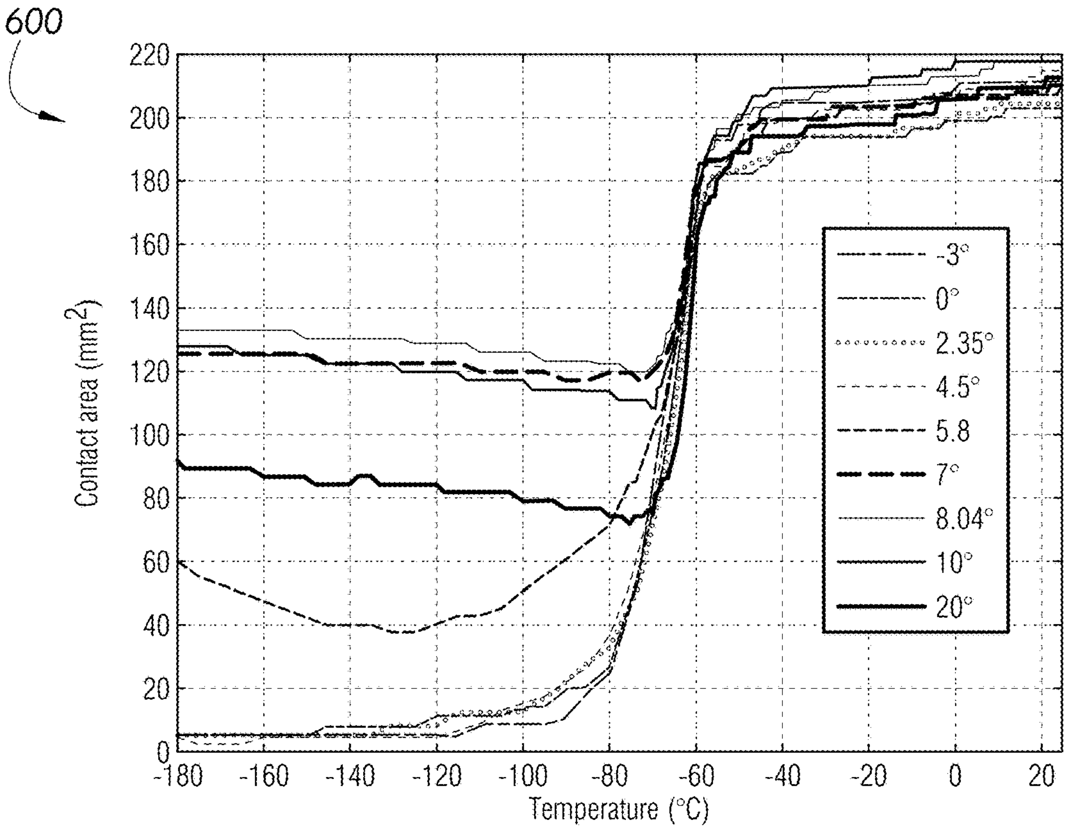
FIG. 6A depicts a plot of contact area between stoppers and upper surfaces of a plurality of glass containers with a 20 mm flange finish including different flange angles as a function of temperature, according to one or more embodiments described herein.
Figure 6B:
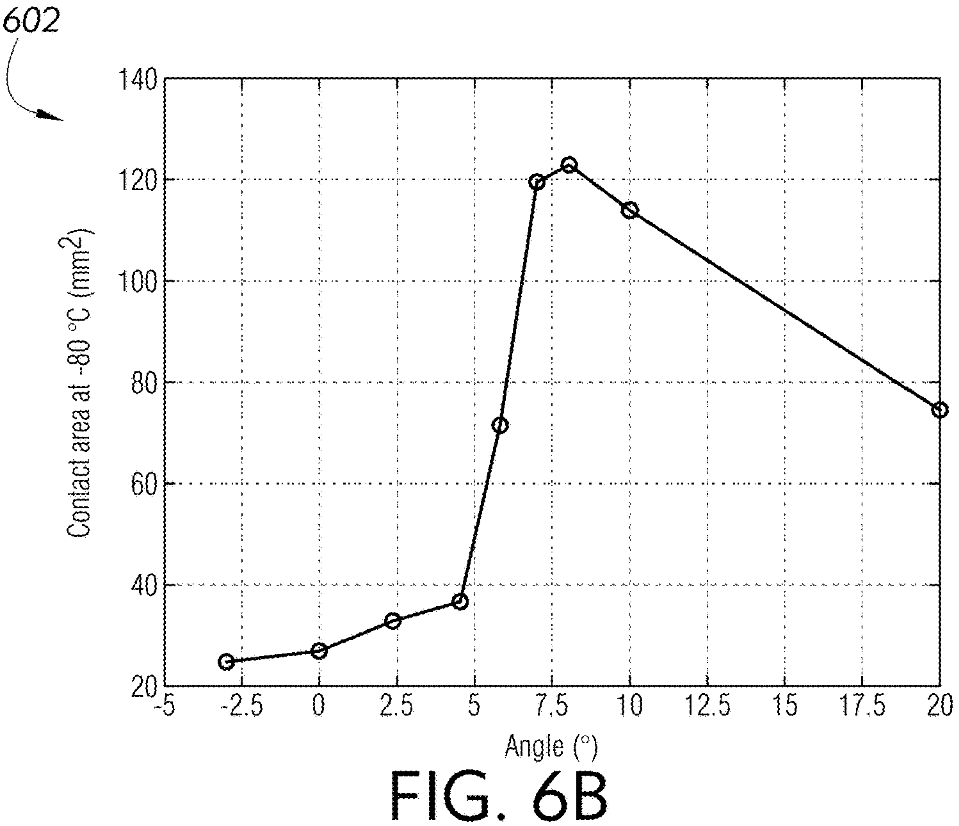
FIG. 6B depicts a plot of contact area between the stoppers and glass containers described with respect to FIG. 6A as a function of flange angle when the glass containers are cooled to −80° C., according to one or more embodiments described herein.

FIGS. 6A and 6B depict plots 600 and 602 of simulation results of contact area between the stopper 106 described herein with respect to FIG. 1 and a plurality of flanges having different flange angles (e.g., different values for the flange angle $\alpha$). FIG. 6A depicts a plot 600 of contact area for the plurality of flanges as a function of storage temperature. As shown, in this example, flange angles that were greater than 5° maintained a contact area greater than 20 $mm^2$, or greater than or equal to 10% of a total surface area of a flange upper surface, at temperatures of less than −100° C. Flange angles of greater than 5° beneficially maintained contact areas with the stopper at greater than 40 $mm^2$ at temperatures of less than or equal to −80° to increase the probability of maintaining container closure integrity.

FIG. 6B depicts a plot 602 of the contact area between the stopper 106 and the plurality flanges at −80° C. as a function of flange angle. As shown, the maximum contact area occurred with a flange angle of approximately 8.3°, which represents a correspondence between the flange angle $\alpha$ and the cap angle $\beta$ (see FIG. 1). Without wishing to be bound by theory, such a flange angle $\alpha$ may beneficially result in uniform compression of the sealing portion 119 of the stopper 106 by the cap assembly 108 (see FIG. 1), without deforming the sealing portion 119 in shape to reduce the contact area. The plot 602 also depicts a sharp increase in contact area as the flange angle increases between 5° and 8.3°. Without wishing to be bound by theory, it is believed that, at a flange angle $\alpha$=5°, the outer peripheral edge 164 of the sealing surface 121 lies directly at the outer peripheral edge 142 of the upper surface 138 (see FIG. 1). Given this, increases from 5° beneficially result in the outer peripheral edge 164 being disposed radially inward of the outer peripheral edge 142 without significantly reducing contact area.

Figure 7A:
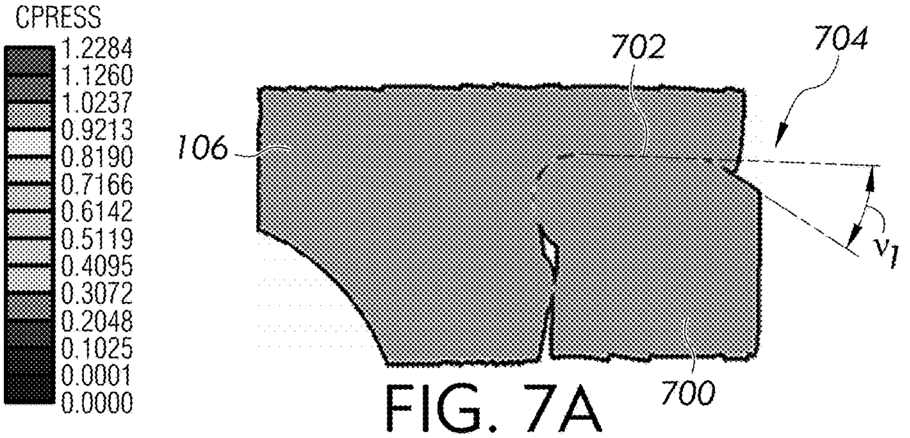
FIG. 7A depicts simulation results of a portion of a stopper compressed against an upper surface of a first glass container including a chamfer extending at a first angle to an upper surface of a flange, according to one or more embodiments described herein.
Figure 7B:
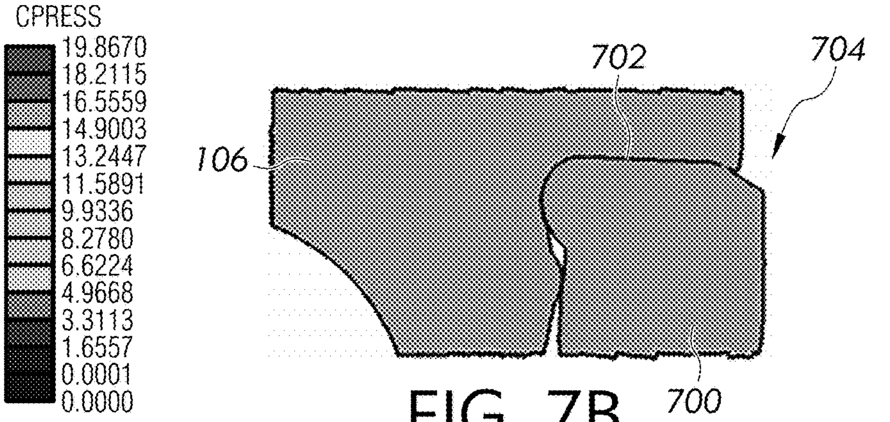
FIG. 7B depicts simulation results of a portion of a stopper compressed against the upper surface of the first glass container of FIG. 7A when cooled to a temperature of −80° C., according to one or more embodiments described herein.
Figure 7C:
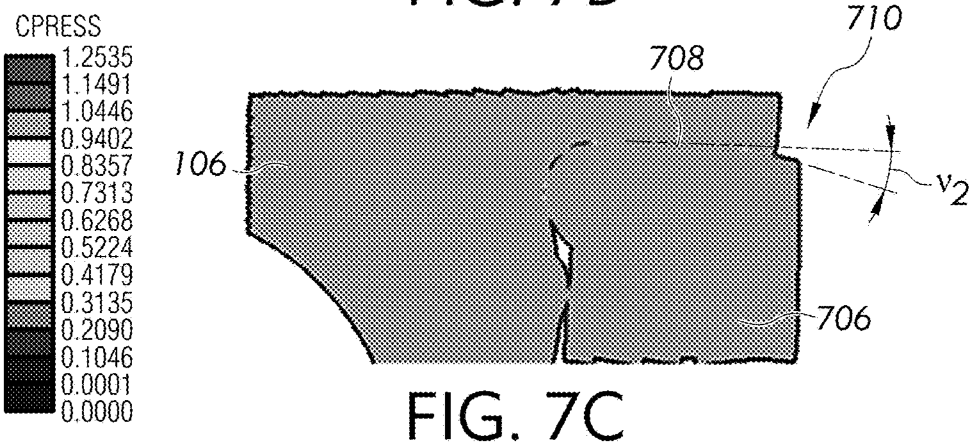
FIG. 7C depicts simulation results of a portion of a stopper compressed against an upper surface of a second glass container including a chamfer extending at a second angle to an upper surface of a flange, according to one or more embodiments described herein.
Figure 7D:
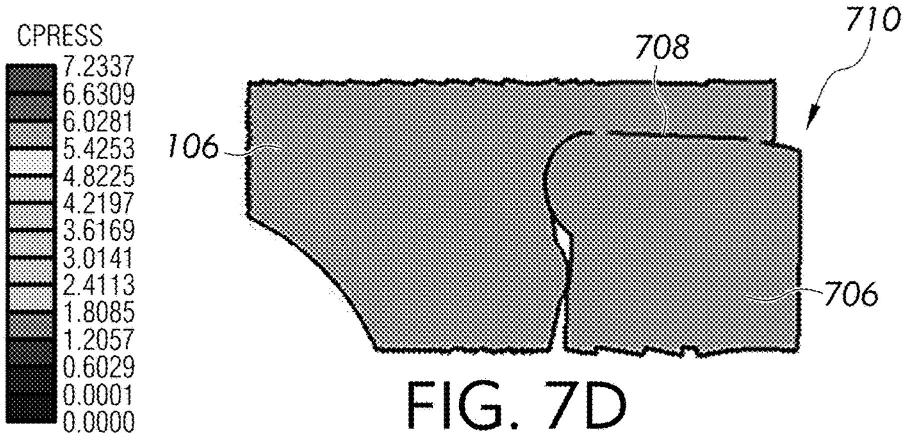
FIG. 7D depicts simulation results of a portion of a stopper compressed against the upper surface of the second glass container of FIG. 7C when cooled to a temperature of −80° C., according to one or more embodiments described herein.
Figure 7E:
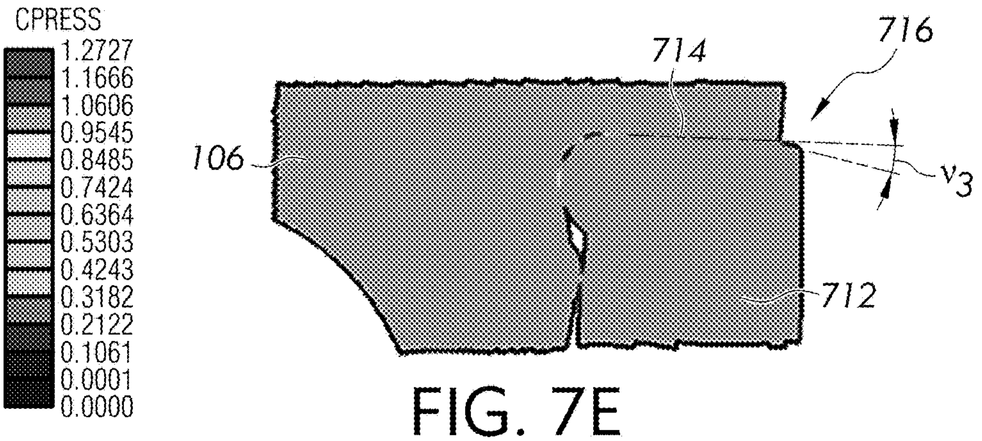
FIG. 7E depicts simulation results of a portion of a stopper compressed against an upper surface of a third glass container including a chamfer extending at a third angle to an upper surface of a flange, according to one or more embodiments described herein.
Figure 7F:
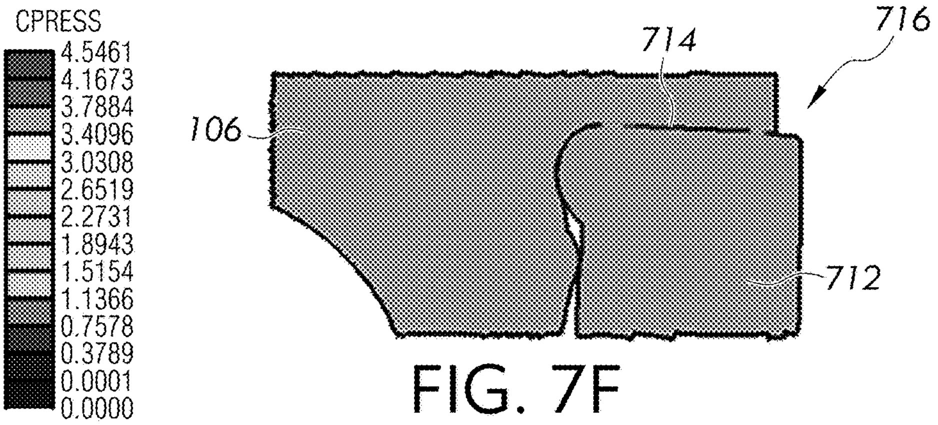
FIG. 7F depicts simulation results of a portion of a stopper compressed against the upper surface of the third glass container of FIG. 7E when cooled to a temperature of −80° C., according to one or more embodiments described herein.

FIGS. 7A-7F depict simulation results of stopper compression as a function of chamfer angle. FIGS. 7A and 7B depict results of a simulation predicting a compression of the stopper 106 described herein with respect to FIG. 1 by the cap assembly 108 (not depicted) against a flange 700 having an upper surface 702 and a transition region 704 comprising a chamfer extending at a first chamfer angle $v_1$=30° at 25° C. and −80° C., respectively. FIGS. 7C and 7D depict results of a simulation predicting a compression of the stopper 106 described herein with respect to FIG. 1 by the cap assembly 108 (not depicted) against a flange 706 having an upper surface 708 and a transition region 710 comprising a chamfer extending at a second chamfer angle $v_2$=10° at 25° C. and −80° C., respectively. FIGS. 7E and 7F depict results of a simulation predicting a compression of the stopper 106 described herein with respect to FIG. 1 by the cap assembly 108 (not depicted) against a flange 712 having an upper surface 714 and a transition region 716 comprising a chamfer extending at a third chamfer angle $v_3$=5° at 25° C. and −80° C., respectively.

The simulations depicted in FIGS. 7A-7F predict the compression of the stopper 106 against the flanges 700, 706, and 712, respectively, when crimped via the cap assembly 108 (not depicted) to provide a residual sealing force of approximately 25 lbf (e.g., greater than or equal to 24.7 lbf and less than or equal 25.6 lbf). Finite element analysis was then performed to simulate compression of the stopper 106 against each of the flanges 700, 706, and 712 at 25° and −80 C°. As shown in FIGS. 7A, 7C, and 7E, each of the flanges maintained a continuous area of compression extending over entire lengths of the upper surfaces 702, 708, and 714, respectively. At −80° C., in contact area between the stopper 106 and the upper surfaces 702, 708, and 714 is inversely proportional to magnitude of the magnitudes of the first, second, and third chamfer angles $v_1$, $v_2$, and $v_3$. That is, at −80° C., the flange 712 comprises the greatest contact area with the stopper 106. Without wishing to be bound by theory, it is believed that the relatively small third chamfer angle $v_3$ facilitates placement of the outer peripheral edge 164 of the sealing surface 121 (see FIG. 1) in contact with the upper surface 714 after capping, which improves the quality of the seal between the stopper 106 and the flange 712. These simulation results verify the efficacy of the modifications of existing pharmaceutical containers described herein.

Figure 8A:
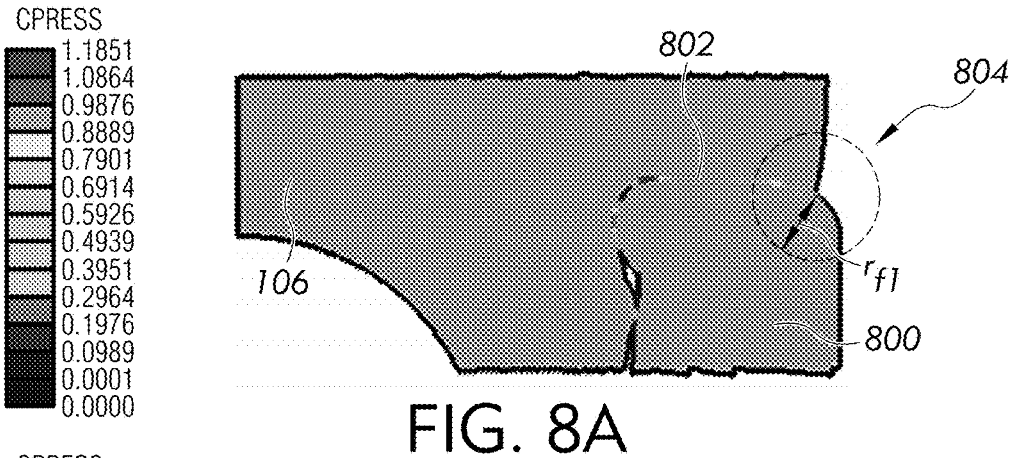
FIG. 8A depicts simulation results of a portion of a stopper compressed against an upper surface of a first glass container including a fillet at an outer diameter thereof having a first radius of curvature at a temperature of 25° C., according to one or more embodiments described herein.
Figure 8B:
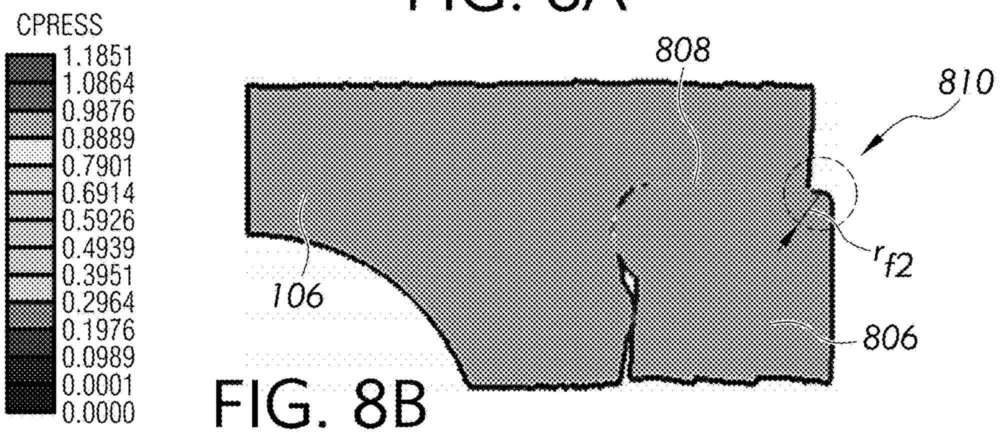
FIG. 8B depicts simulation results of a portion of a stopper compressed against an upper surface of a second glass container including a fillet at an outer diameter thereof having a second radius of curvature at a temperature of 25° C., according to one or more embodiments described herein.
Figure 8C:
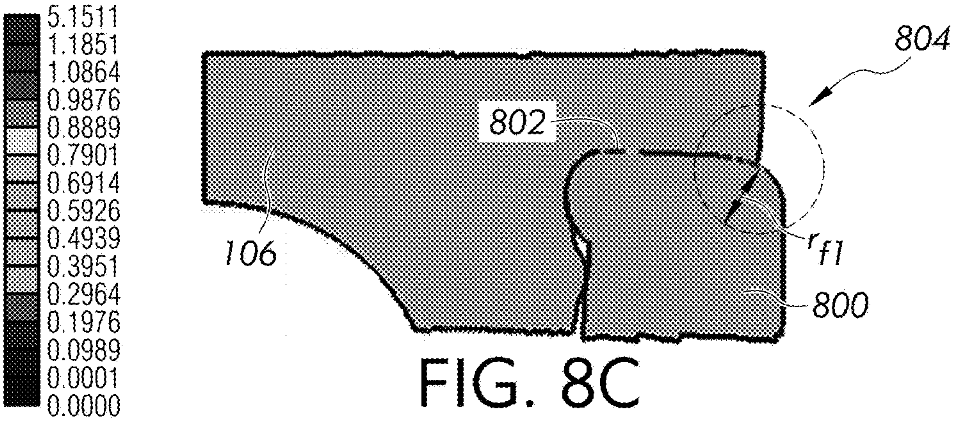
FIG. 8C depicts simulation results of a portion of a stopper compressed against the upper surface of the first class container of FIG. 8A when cooled to a temperature of −80°, according to one or more embodiments described herein.
Figure 8D:
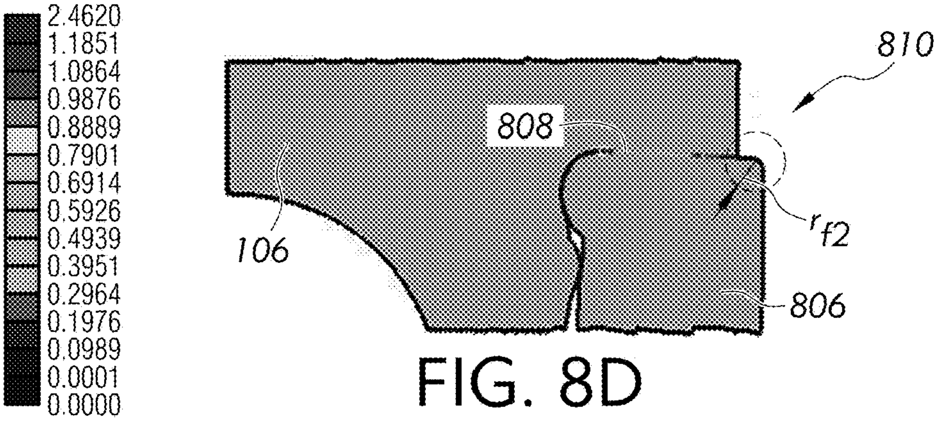
FIG. 8D depicts simulation results of a portion of a stopper compressed against the upper surface of the second class container of FIG. 8B when cooled to a temperature of −80°, according to one or more embodiments described herein.
Figure 8E:
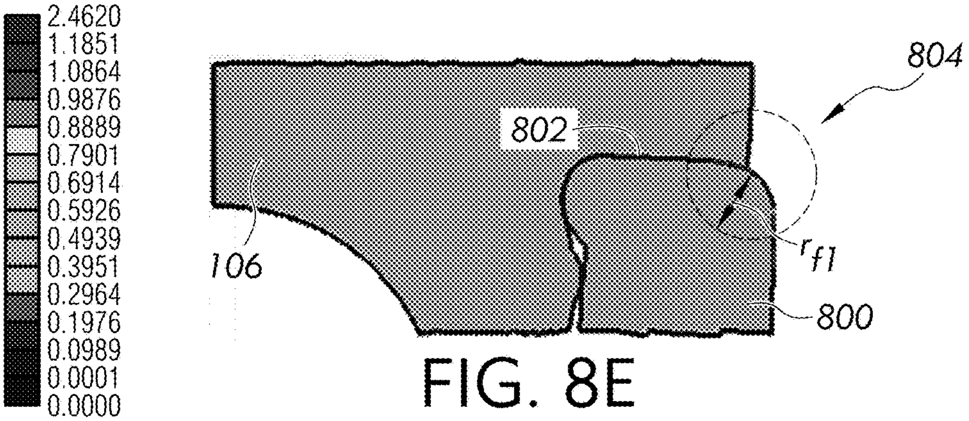
FIG. 8E depicts simulation results of a portion of a stopper compressed against the upper surface of the first class container of FIG. 8A when cooled to a temperature of −180°, according to one or more embodiments described herein.
Figure 8F:
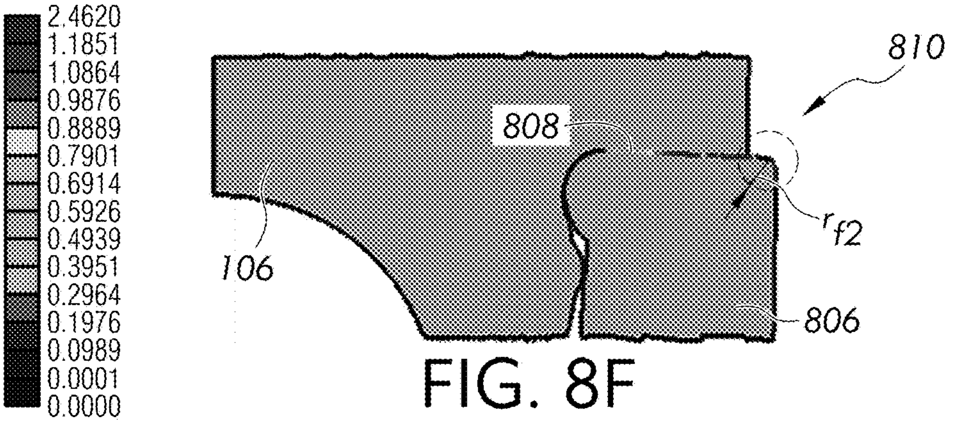
FIG. 8F depicts simulation results of a portion of a stopper compressed against the upper surface of the second class container of FIG. 8B when cooled to a temperature of −180°, according to one or more embodiments described herein.

FIGS. 8A-8F depict simulation results of stopper compression by two different flanges 800 and 806 that vary from one another in terms of fillet radius $r_f$. FIGS. 8A and 8B depict results of simulations predicting a compression of the stopper 106 described herein with respect to FIG. 1 by the cap assembly 108 (not depicted) against flanges 800 and 806 comprising upper surfaces 802 and 808 and transition regions 804 and 810 having different chamfer radii $r_{f1}$ and $r_{f2}$ at 25° C. In the simulation, $r_{f1}$ was equal to 0.8 mm and $r_{f2}$ was equal to 0.3 mm. FIGS. 8C and 8D depict results of simulations predicting a compression of the stopper 106 described herein with respect to FIG. 1 by the cap assembly 108 (not depicted) against the flanges 800 and 806 at −80°. FIGS. 8E and 8F depict results of simulations predicting a compression of the stopper 106 described herein with respect to FIG. 1 by the cap assembly 108 (not depicted) against the flanges 800 and 806 at −180°.

The simulations depicted in FIGS. 8A-8F predicted the compression of the stopper 106 against the flanges 800 and 806, respectively, when crimped via the cap assembly 108 (not depicted) to provide a residual sealing force of approximately 25 lbf (e.g., greater than or equal to 24.7 lbf and less than or equal 25.6 lbf). Finite element analysis was then performed to simulate compression of the stopper 106 against each of the flanges 800 and 806 at 25°, −80° C., and −180° C. As shown in FIGS. 8A and 8B, at 25° C., both of the flanges 800 and 806 maintained a continuous contact area with the stopper 106 covering entireties of the upper surfaces 802 and 808, respectively. As shown in FIGS. 8C and 8D, at −80°, the flange 800 (possessing the larger fillet radius $r_{f2}$) does not maintain a continuous contact area with the stopper 106 (a substantial breakage in contact exists radially inward of the outer peripheral edge 164, see FIG. 1), whereas the flange 806 maintains a continuous contact area covering substantially the entirety of the upper surface 808. That is, according to the simulation results, the reduced fillet radius $r_{f2}$ significantly improved the quality of the seal at −80° over the flange 800, holding every other variable constant. The improvements provided by the reduced fillet radius $r_{f2}$ over the flange 800 are even more pronounced at −180° C. As depicted in FIG. 8E, at −180° C., the flange 800 only maintained contact with the stopper 106 proximate to the outer peripheral edge 164 (see FIG. 1), whereas the flange 806 maintained contact over substantially the entirety of the upper surface 808, indicating a substantial improvement in seal quality. These simulation results verify the efficacy of the modifications of existing pharmaceutical containers described herein.

Figure 9:
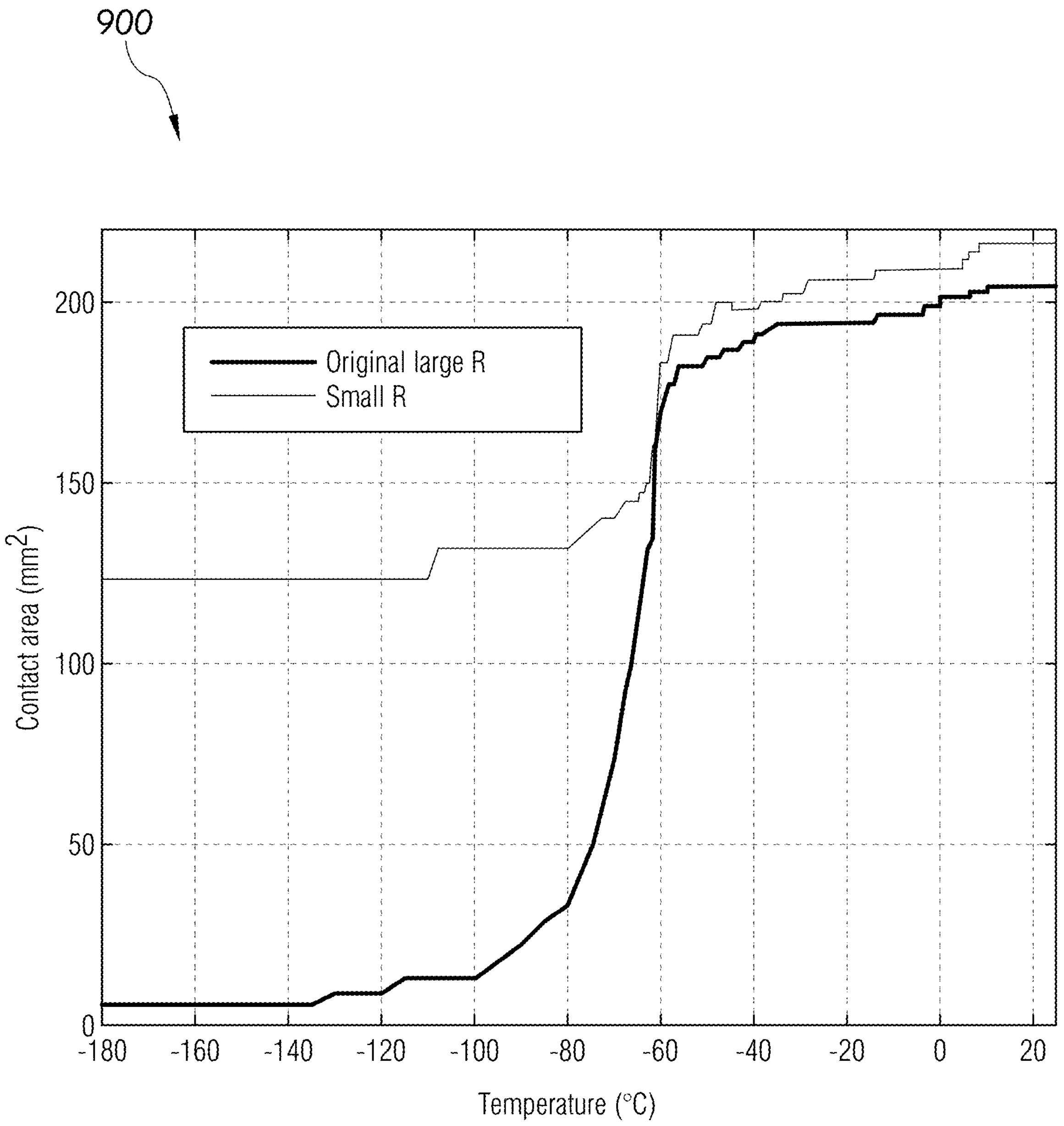
FIG. 9 depicts a plot of contact areas between stoppers and glass containers having different fillet radii as a function of temperature, according to one or more embodiments described herein.

FIG. 9 depicts a plot 900 of a simulation of the flanges 800 and 806 described herein with respect to FIGS. 8A-8F being cooled to various storage temperatures with the stopper 106 described herein with respect to FIG. 1 being crimped against the upper surfaces 802 and 808 by the cap assembly 108. The plot depicts the contact area achieved by each of the flanges 800 and 806 as a function of storage temperature. As depicted in FIG. 9, the contact area achieved by the flange 800, comprising the larger fillet radius $r_{f2}$ associated with existing pharmaceutical glass containers, begins to significantly drop off at temperatures greater than −80° (at approximately −60° C.), which renders the flange 800 unsuitable for storage at such temperatures. Indeed, for the flange 800, the simulated contact area appears to drop beneath 20 $mm^2$ between −80° C. and −100° C. The contact area by the flange 806, in contrast, reduces to a much lesser extent than for the flange 800 at temperatures lower than −60° C. The flange 806 appears to maintain a contact area with the stopper 106 at greater than 120 $mm^2$ at temperatures as low as −180° C. Accordingly, by ensuring the relative positioning between the outer peripheral edge 164 of the sealing surface 121 of the stopper 106 (see FIG. 1) described herein, the probability of maintaining container closure integrity at storage temperatures as low as −160° C. is significantly increased. Such increases in seal quality may be achieved without any modifications to the capping process.

In view of the foregoing description, it should be understood that sealed glass containers capable of maintaining container closure integrity at storage temperatures of less than or equal to −70° C. are disclosed. Improved seals may be achieved entirely through modification of the structure of flanges of the glass containers without adjusting current capping processes. Flange angles, fillet radii, and chamfer angles of glass pharmaceutical containers meeting the requirements described herein beneficially facilitate an outer peripheral edge of a sealing surface of a stopper associated with a standard capping process contacting upper surfaces of the flanges. Such upper surfaces may be free of surface defects to facilitate continuous contact with the sealing surface of the stopper and improved seal quality.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A sealed pharmaceutical container comprising:

a shoulder;

a neck extending from the shoulder; and a flange extending from the neck, the flange comprising:

an underside surface extending from the neck;

an outer surface extending from the underside surface, the outer surface defining an outer diameter of the flange; and a contact surface extending between the outer surface and an inner surface defining an opening in the sealed pharmaceutical container, wherein the contact surface comprises an inner edge disposed proximate to the opening and an outer peripheral edge disposed proximate to the outer surface of the flange;

a fillet extending between the contact surface and the outer surface, the fillet having a radius of curvature that is less than or equal to 21% of a length of the contact surface of the flange; and a sealing assembly comprising a stopper extending over the contact surface of the flange and covering the opening, and a cap securing the stopper to the flange, wherein:

the stopper comprises a sealing surface that is secured in contact with the contact surface of the flange to form a seal between the flange and the stopper, and an outer peripheral edge of the sealing surface is disposed at or radially inward of the outer peripheral edge of the contact surface of the flange.

2. The sealed pharmaceutical container of claim 1, wherein the contact surface comprises a conical region of an upper surface of the flange.

3. The sealed pharmaceutical container of claim 1, wherein the contact surface comprises a surface roughness of less than or equal to 0.2 μm.

4. The sealed pharmaceutical container of claim 3, wherein the contact surface is free of surface height variations greater than or equal to 5.0 μm.

5. The sealed pharmaceutical container of claim 1, wherein the outer peripheral edge of the sealing surface is disposed radially inward of a transition between the contact surface and the fillet.

6. The sealed pharmaceutical container of claim 1, wherein the contact surface extends at a flange angle relative to a plane extending through an end of the opening.

7. The sealed pharmaceutical container of claim 6, wherein the flange angle is greater than or equal to 5°.

8. The sealed pharmaceutical container according to claim 6, wherein:

the cap comprises a metallic portion crimped around the underside surface of the flange and a plastic portion retaining an upper portion the metallic portion on an upper surface of the stopper, and an inner edge of the metallic portion is inserted into the plastic portion such that the upper portion extends at a cap angle relative to the plane extending through the end of the opening.

9. The sealed pharmaceutical container of claim 8, wherein the flange angle is within one degree of the cap angle.

10. The sealed pharmaceutical container of claim 1, wherein the stopper is compressed by the cap to provide a residual nominal strain of less than or equal to 8%.

11. The sealed pharmaceutical container of claim 1, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

12. The sealed pharmaceutical container of claim 1, wherein the sealing surface maintains a contact area of greater than or equal to 10% of a total surface area of the contact surface as the sealed pharmaceutical container is cooled to a temperature of less than or equal to −80° C.

13. A sealed pharmaceutical container comprising:

a shoulder;

a neck extending from the shoulder; and a flange extending from the neck, the flange comprising:

an underside surface extending from the neck;

an outer surface extending from the underside surface, the outer surface defining an outer diameter of the flange; and an upper surface extending between the outer surface and an inner surface defining an opening in the sealed pharmaceutical container, wherein the upper surface comprises:

a conical region extending between the opening and the outer surface, wherein the conical region is free of surface height deviations of greater than or equal to 5 μm; and a transition region extending between the conical region and the outer surface, the transition region comprising a chamfer extending at an angle that is less than or equal to 30° relative to the conical region or a fillet having a radius of curvature that is less than or equal to 21% of a width of the conical region; and a sealing assembly comprising:

a stopper covering the opening; and a cap crimped to the underside surface of the flange so as to compress a sealing surface of the stopper against the conical region such that an outer peripheral edge of the sealing surface contacts the conical region.

14. The sealed pharmaceutical container of claim 13, wherein the upper surface comprises a Ra value of less than or equal 5 nm.

15. The sealed pharmaceutical container of claim 13, wherein the sealing surface maintains a contact area of greater than or equal to 10% of a total surface area of the upper surface as the sealed pharmaceutical container is cooled to a temperature of less than or equal to −80° C.

16. The sealed pharmaceutical container of claim 13, wherein the conical portion extends at a flange angle relative to a plane extending through an end of the opening that is greater than or equal to 5°.

17. The sealed pharmaceutical container according to claim 16, wherein:

the cap comprises a metallic portion crimped around the underside surface of the flange and a plastic portion retaining an upper portion the metallic portion on an upper surface of the stopper, and an inner edge of the metallic portion is inserted into the plastic portion such that the upper portion extends at a cap angle relative to the plane extending through the end of the opening.

18. The sealed pharmaceutical container of claim 17, wherein the flange angle is within one degree of the cap angle.

19. The sealed pharmaceutical container of claim 13, wherein the stopper is compressed by the cap to provide a residual nominal strain of less than or equal to 8%.

20. The sealed pharmaceutical container of claim 13, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

21. The sealed pharmaceutical container of claim 13, wherein the sealing surface maintains a contact area of greater than or equal to 20 $mm^2$ with the upper surface as the sealed pharmaceutical container is cooled to a temperature of less than or equal to −80° C.

22. A sealed pharmaceutical container comprising:

a shoulder;

a neck extending from the shoulder; and a flange extending from the neck, the flange comprising:

an underside surface extending from the neck;

an outer surface extending from the underside surface, the outer surface defining an outer diameter of the flange; and a contact surface extending between the outer surface and an inner surface defining an opening in the sealed pharmaceutical container, wherein the contact surface comprises an inner edge disposed proximate to the opening and an outer peripheral edge disposed proximate to the outer surface of the flange;

a chamfer extending between the contact surface and the outer surface at an angle that is less than or equal to 30° relative to the contact surface; and a sealing assembly comprising a stopper extending over the contact surface of the flange and covering the opening, and a cap securing the stopper to the flange, wherein:

the stopper comprises a sealing surface that is secured in contact with the contact surface of the flange to form a seal between the flange and the stopper, and an outer peripheral edge of the sealing surface is disposed at or radially inward of the outer peripheral edge of the contact surface of the flange.

23. The sealed pharmaceutical container of claim 22, wherein the contact surface comprises a conical region of an upper surface of the flange.

24. The sealed pharmaceutical container of claim 22, wherein the contact surface comprises a surface roughness of less than or equal to 0.2 μm.

25. The sealed pharmaceutical container of claim 24, wherein the contact surface is free of surface height variations greater than or equal to 5.0 μm.

26. The sealed pharmaceutical container of claim 22, wherein the outer peripheral edge of the sealing surface is disposed radially inward of a transition between the upper sealing surface and the chamfer.

27. The sealed pharmaceutical container of claim 22, wherein the contact surface extends at a flange angle relative to a plane extending through an end of the opening.

28. The sealed pharmaceutical container of claim 27, wherein the flange angle is greater than or equal to 5°.

29. The sealed pharmaceutical container according to claim 27, wherein:

the cap comprises a metallic portion crimped around the underside surface of the flange and a plastic portion retaining an upper portion the metallic portion on an upper surface of the stopper, and an inner edge of the metallic portion is inserted into the plastic portion such that the upper portion extends at a cap angle relative to the plane extending through the end of the opening.

30. The sealed pharmaceutical container of claim 29, wherein the flange angle is within one degree of the cap angle.

31. The sealed pharmaceutical container of claim 22, wherein the stopper is compressed by the cap to provide a residual nominal strain of less than or equal to 8%.

32. The sealed pharmaceutical container of claim 22, wherein the sealing assembly maintains the helium leakage rate of the sealed pharmaceutical container of less than or equal to $1.4\times10^{-6}$ $cm^3/s$ as the sealed pharmaceutical container is cooled to a temperature of less than or equal to −80° C.

33. The sealed pharmaceutical container of claim 22, wherein the sealing surface maintains a contact area of greater than or equal to 10% of a total surface area of the contact surface as the sealed pharmaceutical container is cooled to a temperature of less than or equal to −80° C.

* * * * *